United States Patent
Hess

(12) 
(10) Patent No.: US 10,094,413 B2
(45) Date of Patent: Oct. 9, 2018

(54) RATCHET LOCKING MECHANISM FOR THREADED FASTENER

(71) Applicant: Enduralock, LLC, Overland Park, KS (US)

(72) Inventor: Harold Hess, Leawood, KS (US)

(73) Assignee: ENDURALOCK, LLC, Overland Park, KS (US)

( * ) Notice: Subject to any disclaimer, the term of this patent is extended or adjusted under 35 U.S.C. 154(b) by 212 days.

(21) Appl. No.: 14/983,216

(22) Filed: Dec. 29, 2015

(65) Prior Publication Data

US 2016/0131175 A1     May 12, 2016

Related U.S. Application Data

(62) Division of application No. 14/319,453, filed on Jun. 30, 2014, now Pat. No. 9,255,600, which is a division
(Continued)

(51) Int. Cl.
| | | |
|---|---|---|
| *F16B 39/32* | (2006.01) | |
| *F16B 39/12* | (2006.01) | |
| *F16B 39/24* | (2006.01) | |

(52) U.S. Cl.
CPC .............. *F16B 39/12* (2013.01); *F16B 39/24* (2013.01); *F16B 39/32* (2013.01)

(58) Field of Classification Search
CPC ....................................................... F16B 39/32
(Continued)

(56) References Cited

U.S. PATENT DOCUMENTS

| | | | | |
|---|---|---|---|---|
| 224,630 A | * | 2/1880 | Beach ..................... | F16B 39/32 411/329 |
| 328,244 A | | 10/1885 | Morningstar | |

(Continued)

FOREIGN PATENT DOCUMENTS

| | | |
|---|---|---|
| DE | 15374 C | 9/1881 |
| JP | 07217634 | 8/1995 |

(Continued)

OTHER PUBLICATIONS

Extended European Search Report corresponding to International Application No. 14836937.4, dated May 11, 2017, 12 pages.
(Continued)

*Primary Examiner* — Flemming Saether
(74) *Attorney, Agent, or Firm* — Armstrong Teasdale LLP

(57) ABSTRACT

A fastening device including a fastener having a head portion and an elongated threaded body portion extending axially from the head portion. The threaded body portion includes opposing flat sections. A lock washer has a lower surface with an array of radially extending engagement teeth. The lock washer also defines an axial aperture for receiving the fastener. The axial aperture has two flat inner surfaces for cooperating with the two flat sections of the threaded body portion to prevent relative rotation of the washer and threaded body portion. A threaded lock nut mates with the threaded body portion. The lock nut has an upper surface with at least one cantilevered pawl members for ratcheted engagement with the array of radially extending engagement teeth of the lock washer.

5 Claims, 26 Drawing Sheets

Related U.S. Application Data of application No. 13/068,171, filed on May 4, 2011, now Pat. No. 8,784,027.

(60) Provisional application No. 61/403,332, filed on Sep. 14, 2010.

(58) Field of Classification Search
USPC .................................. 411/326–329, 950–952
See application file for complete search history.

(56) References Cited

U.S. PATENT DOCUMENTS

| | | | |
|---|---|---|---|
| 899,080 A * | 9/1908 | Stark | F16B 39/32 411/329 |
| 955,054 A | 4/1910 | Darby | |
| 961,371 A | 6/1910 | Posey | |
| 1,057,311 A * | 3/1913 | White | F16B 39/04 411/205 |
| 1,060,005 A * | 4/1913 | Kistler | F16B 39/32 411/328 |
| 1,080,199 A | 12/1913 | Doolittle | |
| 1,140,974 A | 5/1915 | Formby | |
| 1,143,508 A | 6/1915 | Conroy | |
| 1,221,194 A | 4/1917 | Lang | |
| 1,225,626 A | 5/1917 | Hannon | |
| 1,246,353 A | 11/1917 | Thigpen | |
| 1,249,336 A | 12/1917 | Cook | |
| 1,253,638 A * | 1/1918 | Short | F16B 39/32 411/329 |
| 1,289,710 A | 12/1918 | Ervin | |
| 1,337,424 A | 4/1920 | Word | |
| 1,367,072 A | 2/1921 | Miyagi | |
| 1,403,902 A | 1/1922 | Fields | |
| 1,467,907 A | 9/1923 | Miyagi | |
| 1,526,914 A | 2/1925 | Kibler | |
| 1,722,541 A * | 7/1929 | Rossetti | F16B 39/32 411/327 |
| 1,868,007 A | 7/1932 | Frelin | |
| 2,018,574 A | 10/1935 | Richter | |
| 2,141,701 A | 12/1938 | Uherkovich | |
| 2,398,965 A | 4/1946 | Rounds | |
| 5,190,423 A | 3/1993 | Ewing | |
| 5,385,583 A | 1/1995 | Cotrel | |
| 5,460,468 A | 10/1995 | DiStacio | |
| 5,538,378 A | 7/1996 | Van Der Drift | |
| 5,575,602 A | 11/1996 | Savage et al. | |
| 5,606,753 A | 3/1997 | Hashimoto | |
| 5,713,708 A | 2/1998 | Van derDrift et al. | |
| 5,735,853 A | 4/1998 | Olerud | |
| 5,888,221 A | 3/1999 | Gelbard | |
| 5,951,224 A | 9/1999 | DiStasio | |
| 5,967,723 A | 10/1999 | Duran | |
| 6,010,289 A | 1/2000 | DiStasio et al. | |
| 6,082,941 A | 7/2000 | Dupont et al. | |
| 6,139,550 A | 10/2000 | Michelson | |
| 6,258,089 B1 | 7/2001 | Campbell et al. | |
| 6,261,291 B1 | 7/2001 | Talaber et al. | |
| 6,361,257 B1 | 3/2002 | Grant | |
| 6,383,186 B1 | 5/2002 | Michelson | |
| 6,398,783 B1 | 6/2002 | Michelson | |
| 6,413,259 B1 | 7/2002 | Lyons et al. | |
| 6,434,792 B1 | 8/2002 | Williamson | |
| 6,602,255 B1 | 8/2003 | Campbell et al. | |
| 6,626,907 B2 | 9/2003 | Campbell et al. | |
| 6,695,846 B2 | 2/2004 | Richelsoph et al. | |
| 6,755,833 B1 | 6/2004 | Paul et al. | |
| 6,935,822 B2 | 8/2005 | Hartmann et al. | |
| 6,976,817 B1 | 12/2005 | Grainger | |
| 7,189,044 B2 | 3/2007 | Ball | |
| 7,270,509 B2 | 9/2007 | Disantis et al. | |
| 7,318,825 B2 | 1/2008 | Butler et al. | |
| 7,374,495 B2 | 5/2008 | Ball | |
| 7,621,943 B2 | 11/2009 | Michelson | |
| 7,763,056 B2 | 7/2010 | Dalton | |
| 7,857,839 B2 | 12/2010 | Duong et al. | |
| 7,887,547 B2 | 2/2011 | Campbell et al. | |
| 7,909,859 B2 | 3/2011 | Mosca et al. | |
| 7,955,037 B2 | 6/2011 | Disantis et al. | |
| 8,123,788 B2 | 2/2012 | Michelson | |
| 8,262,711 B2 | 9/2012 | Hess | |
| 8,366,365 B2 | 2/2013 | Disantis et al. | |
| 2005/0207865 A1 | 9/2005 | Disantis et al. | |
| 2005/0209599 A1 | 9/2005 | Brunsvold | |
| 2006/0015104 A1 | 1/2006 | Dalton | |
| 2008/0063489 A1 | 3/2008 | Jimenez | |
| 2009/0060682 A1 | 3/2009 | Yeh et al. | |
| 2009/0192553 A1 | 7/2009 | Maguire et al. | |
| 2010/0121383 A1 | 5/2010 | Stanaford et al. | |
| 2012/0063864 A1 | 3/2012 | Hess | |

FOREIGN PATENT DOCUMENTS

| | | |
|---|---|---|
| JP | 2002235724 A | 8/2002 |
| JP | 2008004743 A | 1/2008 |
| KR | 200241791 | 10/2001 |
| KR | 20100863200 | 10/2008 |
| KR | 2011-0099247 A | 9/2011 |

OTHER PUBLICATIONS

International Preliminary Report (PCT/IB/373) and Written Opinion on Patentability (PCT/ISA/237) in corresponding International Application PCT/US2011/051189, dated Mar. 19, 2013.
TineLok: Overview, www.tinelok.com (2013).
TineLok, The Revolutionary Vibration-Proof Fastener System, www.tinelok.com (2013).
Written Opinion with International Search Report from Application No. PCT/US2011/051189, dated Jun. 28, 2012.
PCT International Search Report and Written Oinion dated Nov. 26, 2014 issued on corresponding PCT International Application No. PCT/US2014/051006.

* cited by examiner

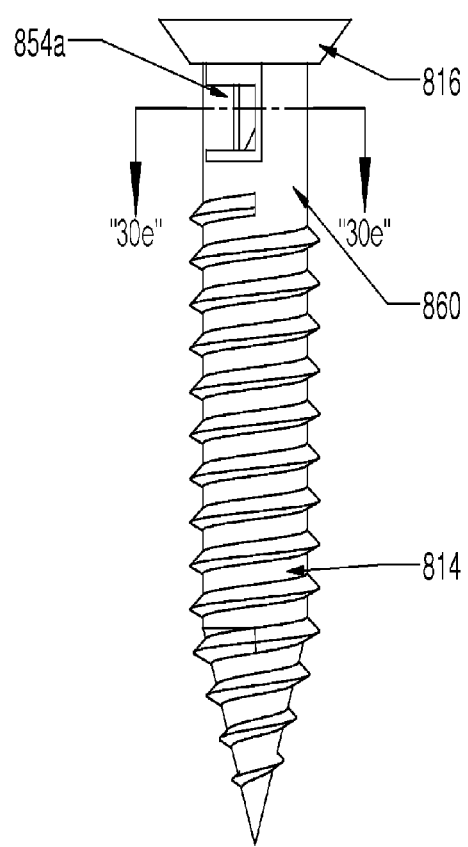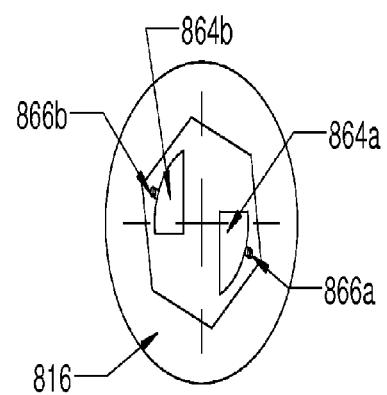
Fig. 30b
Fig. 30c

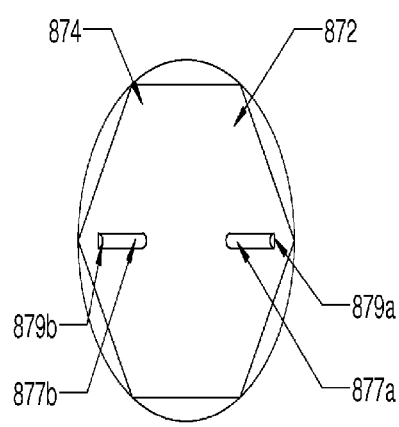
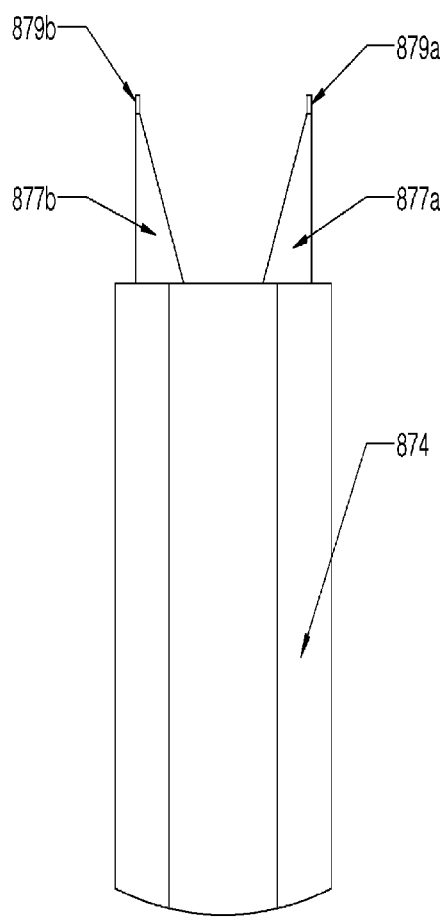
Fig. 32c
Fig. 32d

RATCHET LOCKING MECHANISM FOR THREADED FASTENER

CROSS-REFERENCE TO RELATED APPLICATION

The subject application is a divisional of U.S. patent application Ser. No. 14/319,453, filed Jun. 30, 2014, which is a divisional application of U.S. patent application Ser. No. 13/068,171, filed May 4, 2011, which claims priority to and the benefits of U.S. Provisional Application No. 61/403,332, filed Sep. 14, 2010, the contents of which are incorporated herein in their entirety.

BACKGROUND OF THE INVENTION

1. Field of the Invention

The subject invention is directed generally to fasteners, and more particularly, to a ratcheting locking mechanism for threaded fasteners.

2. Background of the Related Art

Threaded fasteners designed to lock male and female threaded components together are well known in the art and include, for example, lock washers, blind thread bores filled with resilient inserts and screw thread profiles that deform when tightened. Fasteners with self-locking accessories such as cotter pins and lock wires are also known. Other examples of self-locking threaded fasteners are disclosed in U.S. Pat. No. 5,460,468 to DiStacio on Oct. 24, 1995; U.S. Pat. No. 5,538,378 to Van der Drift on Jul. 23, 1996; and U.S. Pat. No. 5,713,708 to Van der Drift et al. on Feb. 3, 1998, each of which is incorporated herein by reference.

SUMMARY OF THE INVENTION

One embodiment of the subject technology is directed to a fastening device including a fastener having a head portion and an elongated threaded body portion extending axially from the head portion. The threaded body portion includes at least one longitudinally extending flat section. The fastening device also includes a lock washer having opposed upper and lower surfaces, wherein the lower surface has an array of radially extending engagement teeth. The lock washer also forms an axial aperture for receiving the threaded body portion of the fastener. The axial aperture has at least one flat inner surface cooperating with the at least one longitudinally extending flat section of the threaded body portion to prevent relative rotation of the washer and threaded body portion. The fastening device further includes a threaded lock nut for rotatably mating with the threaded body portion. The lock nut has opposed upper and lower surfaces. The upper surface of the threaded lock nut has at least one flexible pawl member for ratcheted engagement with the array of radially extending engagement teeth on the lower surface of the lock washer.

In another embodiment, the subject technology is directed to a fastening device including a fastener having a head portion and an elongated threaded body portion extending axially from the head portion. A lock member has a lower surface with a plurality of ratchet teeth. The lock member couples to the body portion for axial movement but is fixed rotationally. A threaded lock nut rotatably mates with the threaded body portion. The lock nut has an upper surface having at least one pawl tooth for engagement with the plurality of ratchet teeth. The lock member may have an axial aperture having at least one flat inner surface cooperating with the at least one longitudinally extending flat section of the threaded body portion. The lock member may be integral with the head portion. In one embodiment, the fastening device includes a plate defining a recess, wherein the lock member couples into the recess to be fixed rotationally.

In still another embodiment, the subject technology is directed to a fastening device including a fastener having a head portion and an elongated threaded body portion extending axially from the head portion. At least one fastener tooth couples to the fastener in a rotationally fixed manner. A locking structure has at least one locking tooth for ratchet engagement with the at least one fastener tooth. The at least one fastener tooth may be on a distal end of a pawl arm extending from the head portion or on a lock washer that is keyed to the fastener. The at least one fastener tooth may be a plurality of ratchet teeth. The at least one locking tooth may also be on a distal end of a pawl arm extending from the locking structure. Alternatively, the locking structure is a plate having an axial recess and the at least one locking tooth is a plurality of radially extending ratchet teeth facing a lower surface of the head portion.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

So that those having ordinary skill in the art to which the subject invention pertains will more readily understand how to make and use the fastening device of the subject invention, preferred embodiments thereof will be described in detail hereinbelow with reference to the following drawings.

FIG. 16a is a perspective view of a tool for assembling and/or disassembling the fastening device of FIG. 12.

FIG. 16b is an enlarged detailed view of the area in circle "16b" of FIG. 16a.

FIG. 27b is a top view of the fastener of FIG. 27a.

FIG. 28a is a top view of a plate structure with the ratchet integral thereto for use with the fastener of FIG. 27a.

FIG. 28c is a sectional perspective view of the plate structure of FIG. 28a.

FIG. 30b is a side view of the fastener of FIG. 29.

FIG. 30c is a top view of the fastener of FIG. 29.

FIG. 30d is an enlarged perspective view of the area in circle "30d" of the fastener in FIG. 30a.

FIG. 31b is a top view of the plate structure of FIG. 31a.

FIG. 32a is a perspective view of the driving tool of FIG. 29.

FIG. 32b is an enlarged perspective view of the area in circle "32a" of the driving tool in FIG. 32a.

FIG. 32c is a top view of the driving tool of FIG. 29.

FIG. 32d is a side view of the driving tool of FIG. 29.

DETAILED DESCRIPTION OF THE PREFERRED EMBODIMENTS

Figure 1:
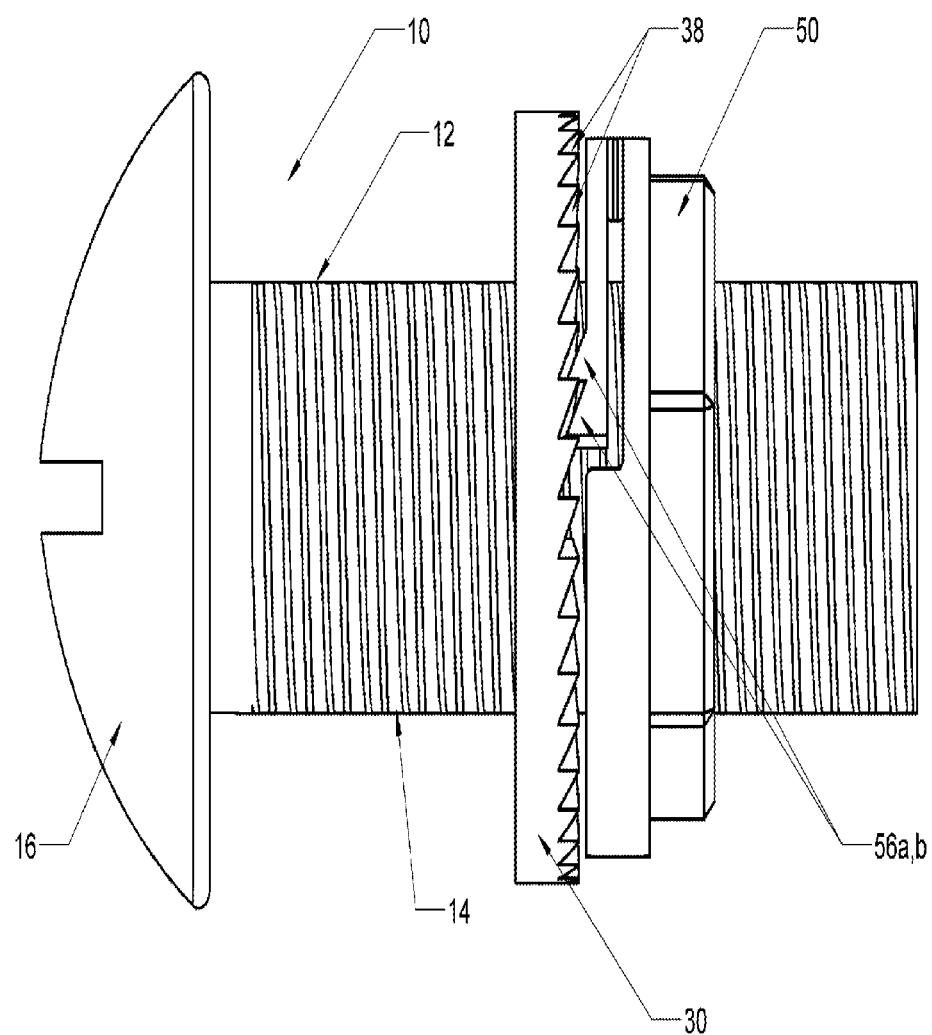
FIG. 1 is a side elevational view of the fastening device of the subject technology in an assembled condition, wherein the lock washer and lock nut are positioned on the body of the fastener.

The present disclosure overcomes many of the prior art problems associated with threaded fasteners. In general, threaded fasteners are used to fixedly connect two or more pieces in a variety of applications such as, without limitation, with surgical implants, industrial applications, and building applications. Among other features and benefits, the disclosed ratchet locking mechanisms for threaded fasteners facilitate quick and easy installation while providing a reliably secured tightness with the ability to remove the fastener if desired. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as upward, downward, left, right, up, down, length, height, width, thickness and the like are with reference to the Figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

Referring now to FIG. 1, a fastening device constructed in accordance with a preferred embodiment of the subject invention and designated generally by reference numeral 10. Fastening device 10 includes a threaded fastener 12 in the form of a carriage bolt or the like, which includes an elongated threaded body portion 14 extending from a slotted head portion 16. Those skilled in the art will readily appreciate that the head portion 16 of fastener 12 could take any conventional form known in the art including, for example, a hexagonal head.

Figure 2:
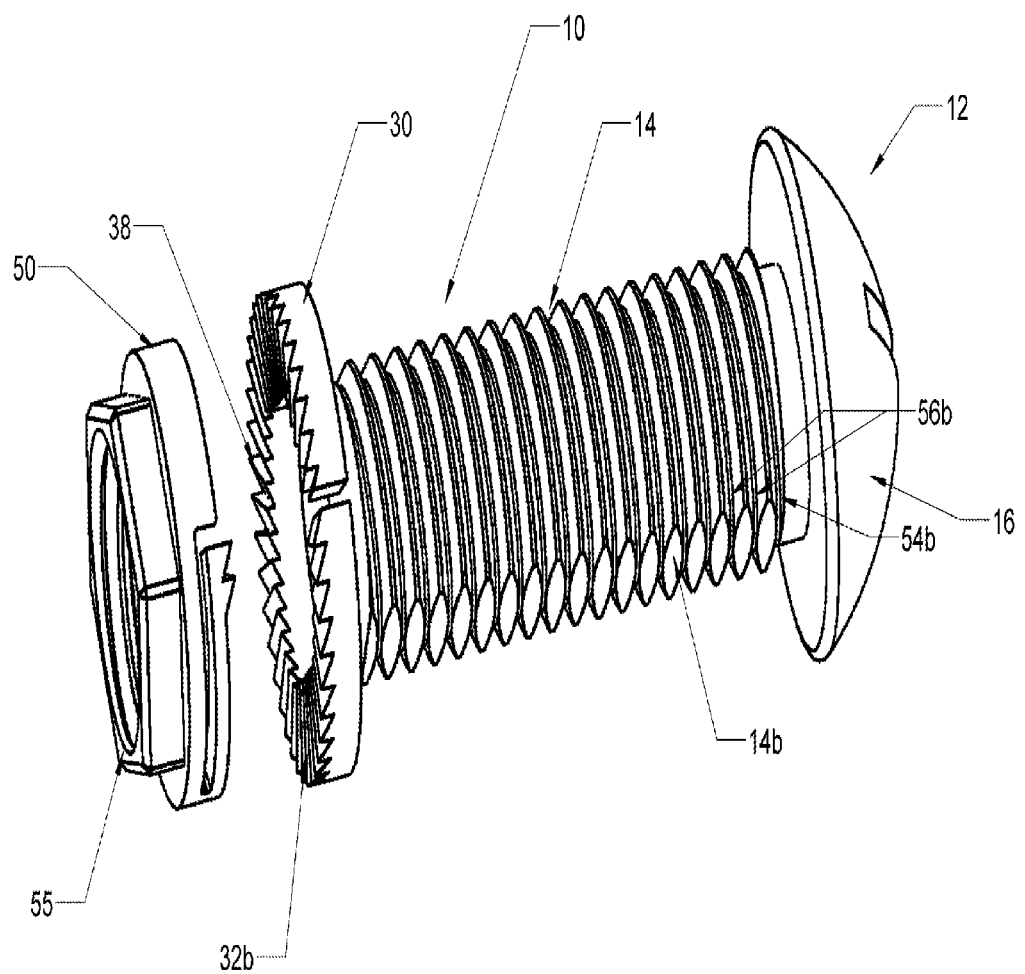
FIG. 2 is a perspective view of the fastening device of the subject technology, with the lock washer and lock nut axially aligned and separated from the fastener body for ease of illustration.
Figure 3:
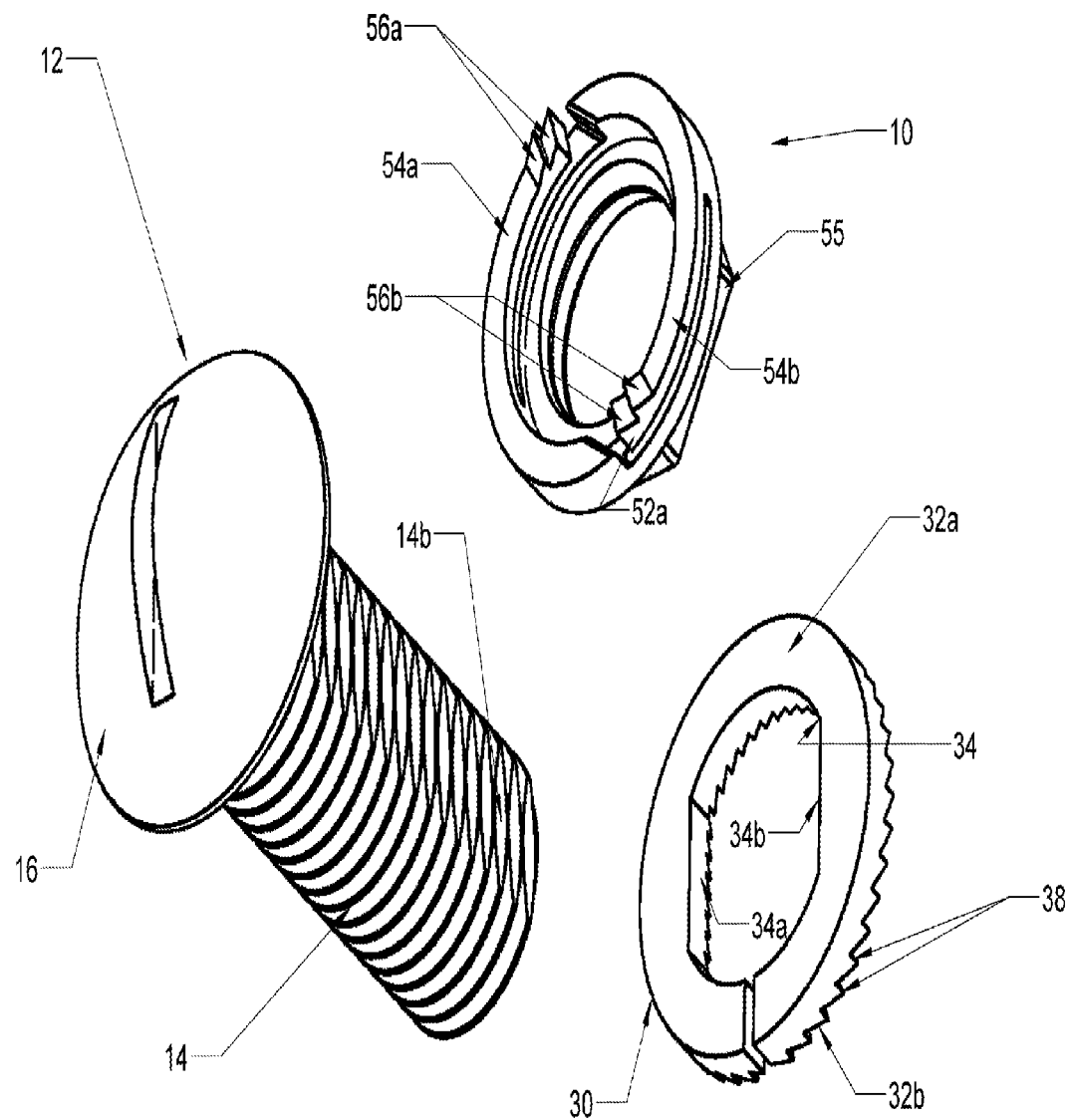
FIG. 3 is a perspective view of the fastening device of the subject technology, as viewed from above, with the lock washer and locking nut axially separated and displaced from the fastener body for ease of illustration.
Figure 4:
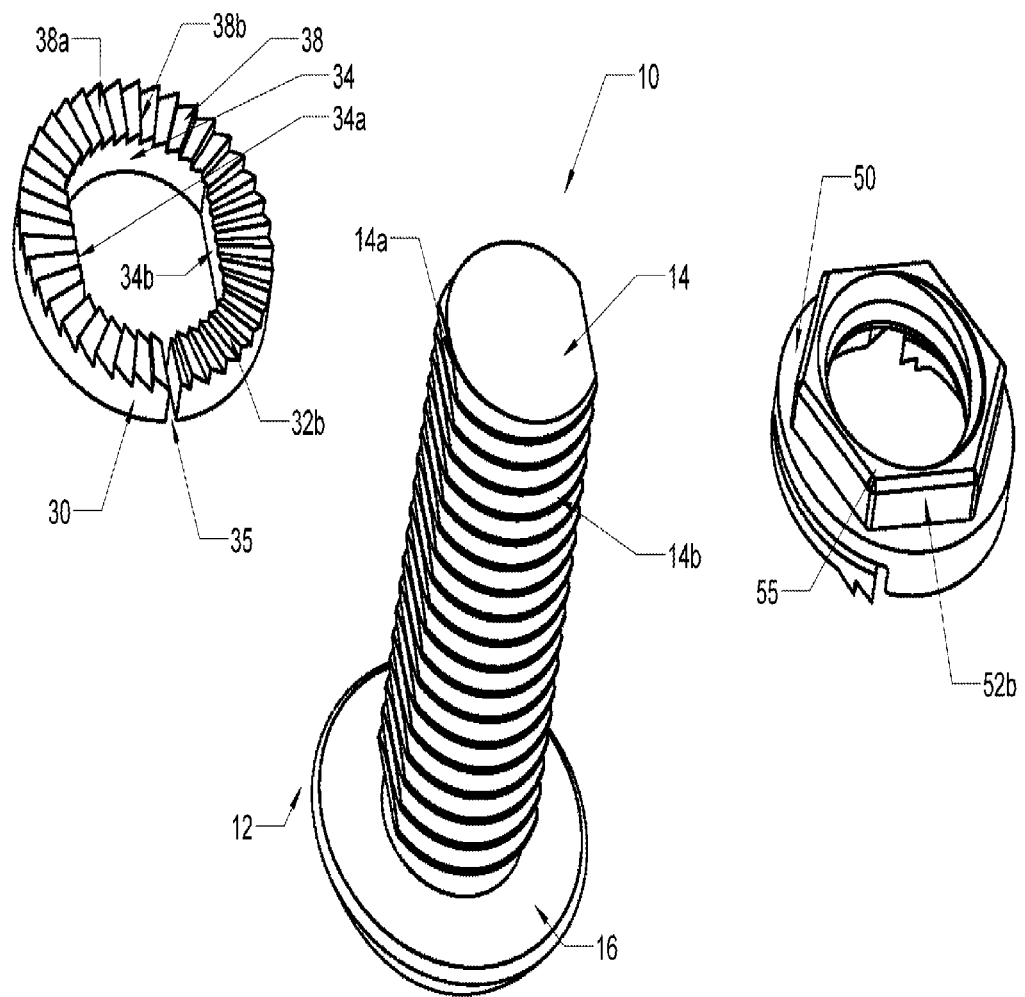
FIG. 4 is a perspective view of the fastening device of the subject technology, as viewed from below, with the lock washer and locking nut axially separated and displaced from the fastener body for ease of illustration.

With additional reference to FIGS. 2 through 4, fastening device 10 further includes an annular lock washer 30 having opposed upper and lower surfaces 32a, 32b, and an axial aperture 34 for receiving the threaded body portion 14 of fastener 12. It is envisioned that the lock washer 30 is a split washer defining a radial gap 35. However, the lock washer 30 may be a continuous ring. The threaded body portion 14 includes a pair of diametrically opposed, longitudinally extending flat sections 14a, 14b and the axial aperture 34 of lock washer 30 includes a pair of diametrically opposed flat surfaces 34a, 34b. The longitudinally extending flat sections 14a, 14b of the threaded body portion 14 and the flat surfaces 34a, 34b of aperture 34 cooperate to inhibit rotational movement of the lock washer 30 relative to the threaded body portion 14, while permitting axial movement of the lock washer 30 relative to the threaded body portion 14 during placement of the fastening device 10 in a structure. The lower surface 32b of lock washer 30 includes an array of circumferentially disposed, radially extending engagement teeth 38, effectively defining an annular rack or ratchet gear. Each tooth 38 is triangular in shape and, preferably, substantially a right triangle with a hypotenuse 38a facing generally axially and a leg 38b being substantially parallel to the threaded body portion 14 when engaged.

Fastening device 10 further includes a locking nut 50 that is threadably associated with the threaded body portion 14 of fastener 12 and includes opposed upper and lower surface portions 52a, 52b. The upper surface portion 52a of locking nut 50 includes a pair of diametrically opposed, cantilevered arcuate pawl arms 54a, 54b. The pawls arms 54a, 54b have pawl teeth pairs 56a, 56b, respectively, that are configured for ratcheted engagement with the array of radial engagement teeth 38 on the lower surface 32b of lock washer 30. The lower surface portion 52b of lock nut 50 defines a hexagonal fitting 55 for interaction with a turning tool such as a conventional wrench or socket (not shown). It should be readily appreciated that preventing the lock washer 30 from rotating on the threaded body portion 14 of fastener 12, while allowing the lock washer 30 to freely travel longitudinally on the body portion 14, allows the lock nut 50 to engage the washer 30, but the nut 50 cannot loosen once the ratcheting pawl arms 54a, 54b of the nut 50 engage the radial teeth 38 of the washer 30 in a tight manner. The pawl teeth pairs 56a, 56b can slide across the hypotenuse 38a of the ratchet teeth 38 during tightening but are prevented from backing up by engagement with the leg 38b of the ratchet teeth 38.

Those skilled in the art will readily appreciate that while the means for preventing the lock washer 30 from rotating relative to the threaded body 14 has been illustrated and described as a pair of diametrically opposed flat sections 14a, 14b on the body and corresponding flat surfaces in the washer aperture 34, other means can also be employed to prevent rotation of the lock washer 30 relative to the threaded body 14. For example, there could be one flat section on the threaded body 14 and one flat surface in the aperture 34 of washer 30. There could be three or more flat sections on the threaded body 14 and a corresponding number of flat sections in the aperture 34 of the washer 30. Alternatively, the body 14 could include one or more longitudinal concavities and one or more corresponding convexities on the inner diameter of the washer 30.

Figure 5:
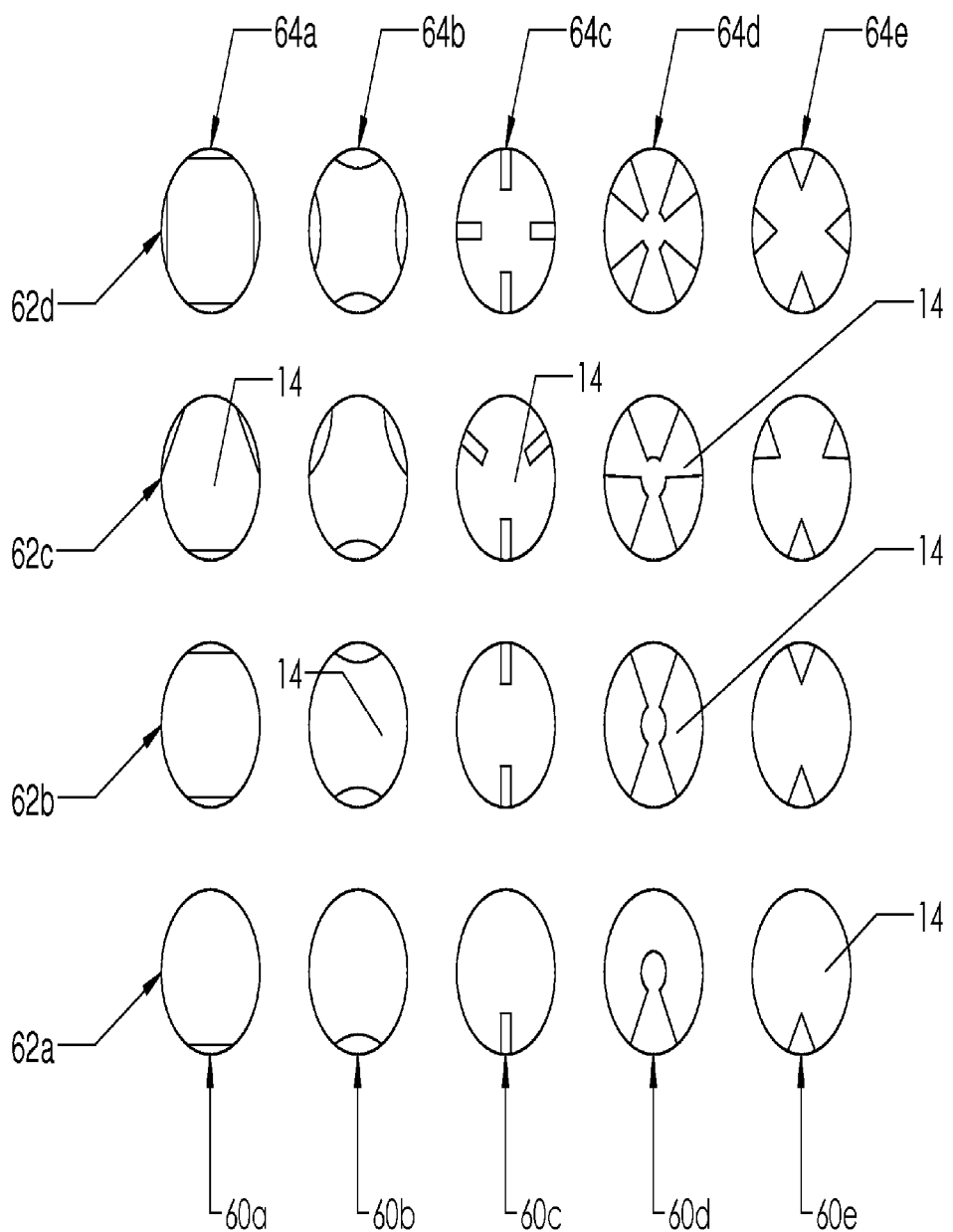
FIG. 5 is an end view of a plurality of configurations of elongated threaded body portions for use with fastening devices of the subject technology.

Referring now to FIG. 5, an end view of a plurality of configurations of elongated threaded body portions 14 for use with fastening devices is shown for further illustration. Each column 60a-e utilizes a different configuration of locking feature 64a-e and each row 62a-d varies the number of times that the locking feature is utilized. As can be seen, the threaded body portion 14 in row 62b and column 60a is shown in FIGS. 1-4. The locking feature 64a is basically a flat portion that is utilized once (row 62a, column 60a) or repeated various times although for simplicity only a maximum of four repetitions (row 62d, column 60a) are shown. Similarly the other locking features of a circular cut (column 60b), a groove cut (column 60c), a wedge or keyhole cut (column 60d), or a triangular cut (column 60e) and the like can be utilized any number of times.

Figure 6:
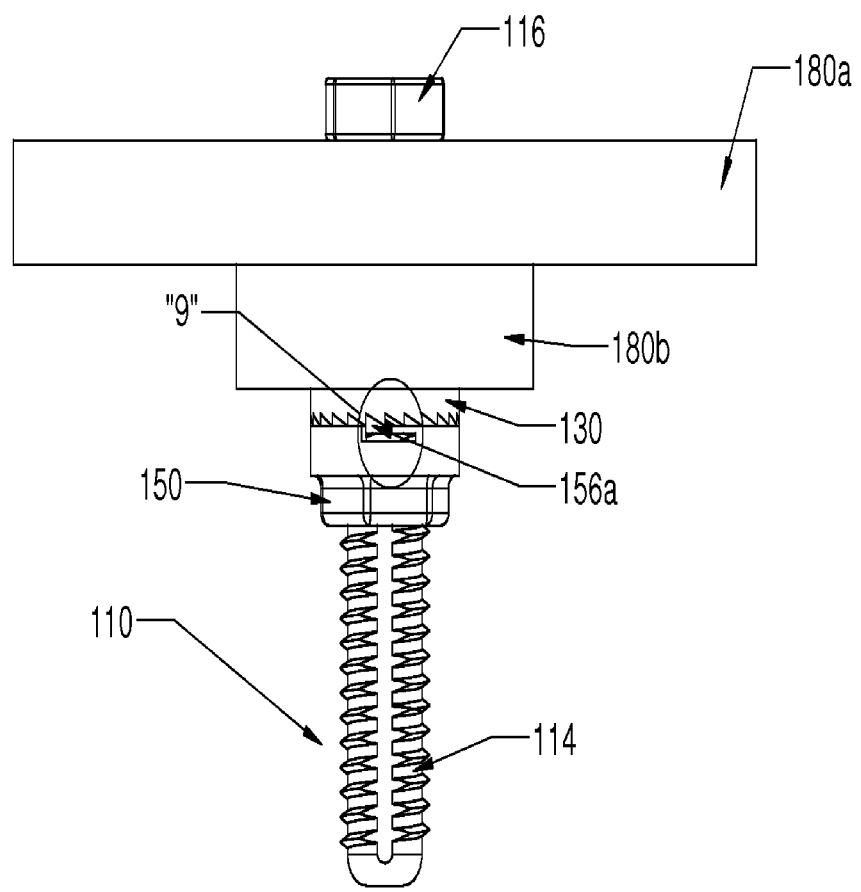
FIG. 6 is a side view of another fastening device of the subject technology assembled to fixedly retain to exemplary plate structures.
Figure 7:
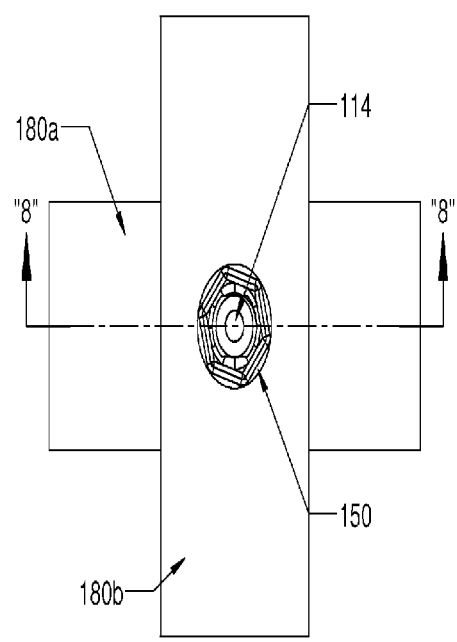
FIG. 7 is a bottom view of the fastening device of FIG. 6.
Figure 8:
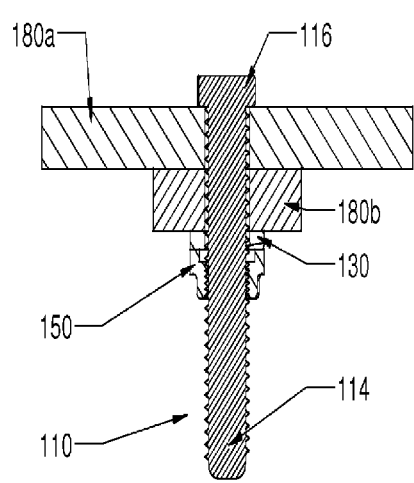
FIG. 8 is a sectional view taken along line "8"-"8" of FIG. 7.

Now referring to FIG. 6, a side view of another fastening device 110 of the subject technology assembled is shown. As will be appreciated by those of ordinary skill in the pertinent art, the fastening device 110 utilizes similar principles to the fastening device 10 described above. Accordingly, like reference numerals preceded by the numeral "1" are used to indicate like elements. The following description is directed to the primary differences of the fastening device 110, which in comparison to the fastening device 10 is the use of a hex head 116 on the threaded fastener 112, a single pawl tooth 156a, 156b on each pawl arm 154a, 154b of the locking nut 150, and a solid ring lock washer 130. The fastening device 110 is shown fixedly retaining two exemplary plate structures 180a, 180b. It is also noted that a slot 155 to create a flexibility in the pawl arm 154a is also relatively shorter in the fastening device 110 as compared with the fastening device 10 shown above. FIGS. 7-11 illustrate various other views to more fully appreciate the structure and operation of the fastening device 110.

Figure 9:
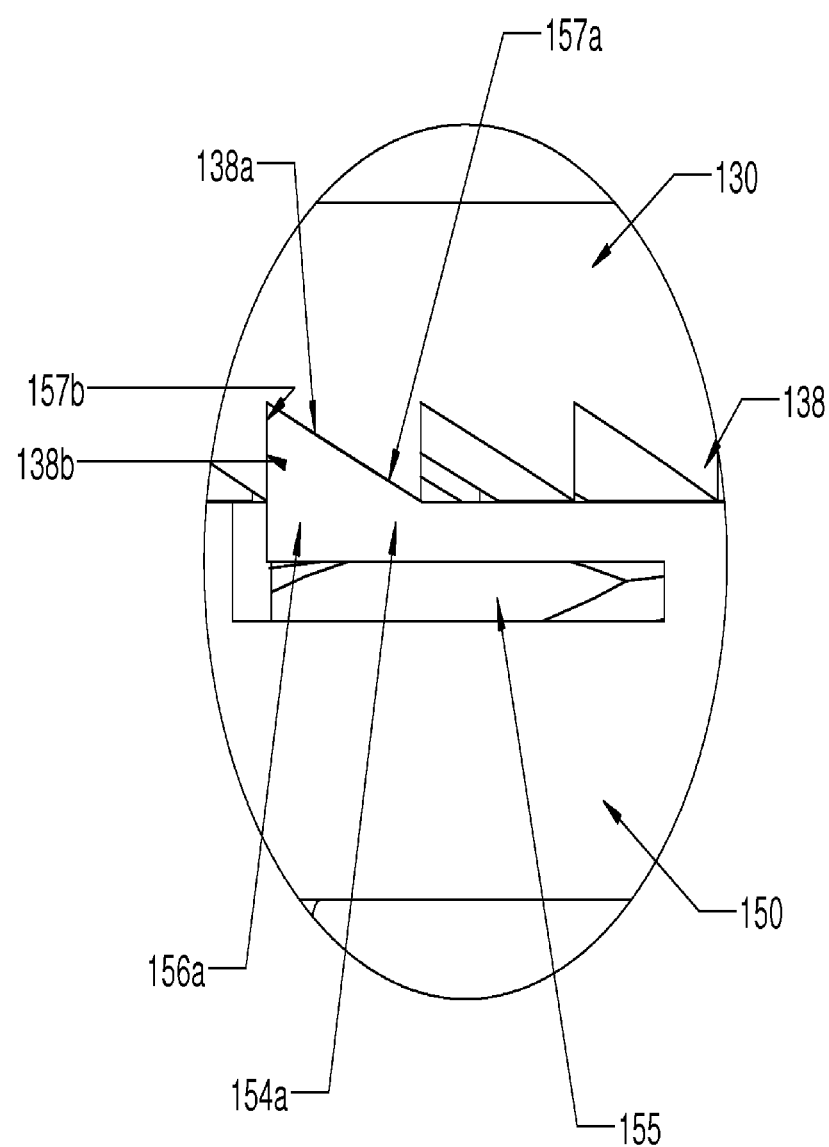
FIG. 9 is an enlarged detailed view of the area in circle "9" of FIG. 6.
Figure 10:
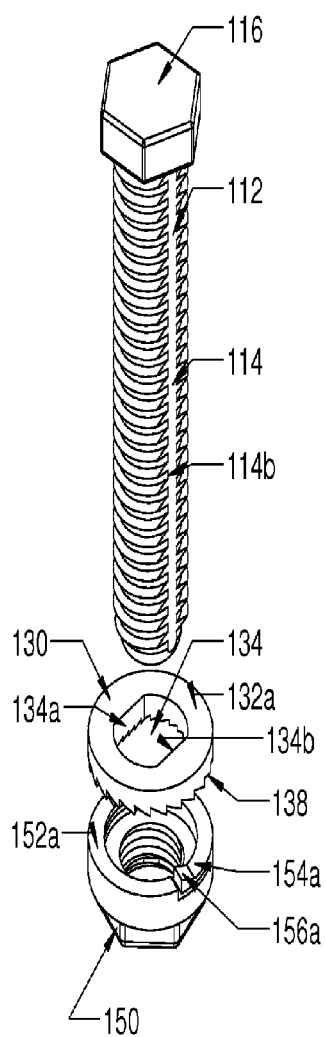
FIG. 10 is a top perspective view of the fastening device of FIG. 6, with the lock washer and locking nut axially aligned and separated from the fastener body for ease of illustration.
Figure 11:
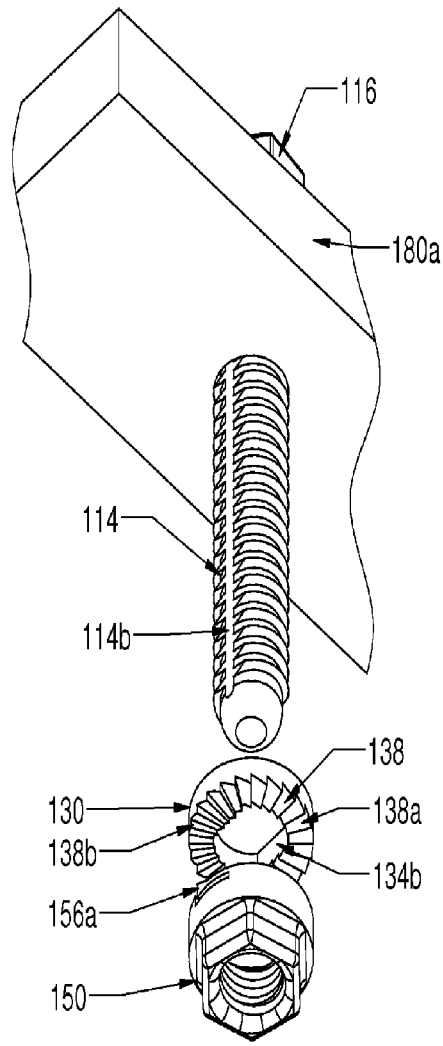
FIG. 11 is a bottom perspective view of the fastening device of FIG. 6, with the threaded body portion extending through a plate and the lock washer and lock nut axially aligned and separated from the fastener body for ease of illustration.

Referring now particularly to FIG. 9, an enlarged detailed view of the area in circle "9" of FIG. 6 is shown to illustrate the pawl tooth 156a of the pawl arm 154a engaged in the teeth 138 of the lock washer 130. The pawl tooth 156a is configured to also have a leg 157b flush against the leg 138b of the corresponding ratchet tooth 138 to prevent loosening of the lock nut 130. However, a hypotenuse 157a of the pawl tooth 156a may still move forward over the hypotenuse 138a of the ratchet tooth 138 by deflection of the pawl arm 154a into the pawl slot 155. It is also envisioned that a radial hole or other feature can be provided in the pawl teeth 156a, 156b so that the pawl teeth 156a, 156b may be pushed or pulled downward into the pawl slot 155 in order to allow the lock nut to be removed after tightening.

Figure 12:
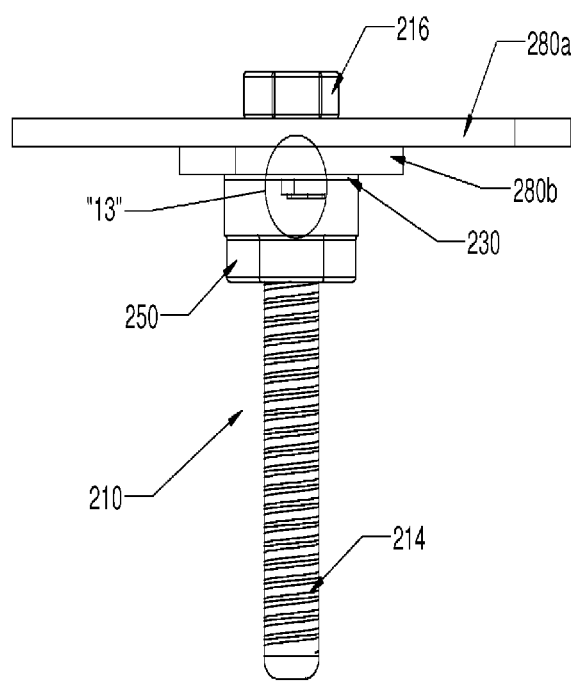
FIG. 12 is a side view of another fastening device of the subject technology assembled to fixedly retain to exemplary plate structures.

Now referring to FIG. 12, a side view of another fastening device 210 of the subject technology assembled is shown. As will be appreciated by those of ordinary skill in the pertinent art, the fastening device 210 utilizes similar principles to the fastening devices 10, 110 described above. Accordingly, like reference numerals preceded by the numeral "2" are used to indicate like elements. The following description is directed to the primary difference of the fastening device 210, which in comparison to the fastening devices 10, 110 is a radial arrangement of the ratchet teeth 238 and pawl teeth 256a, 256b as opposed to a face to face arrangement.

Figure 14:
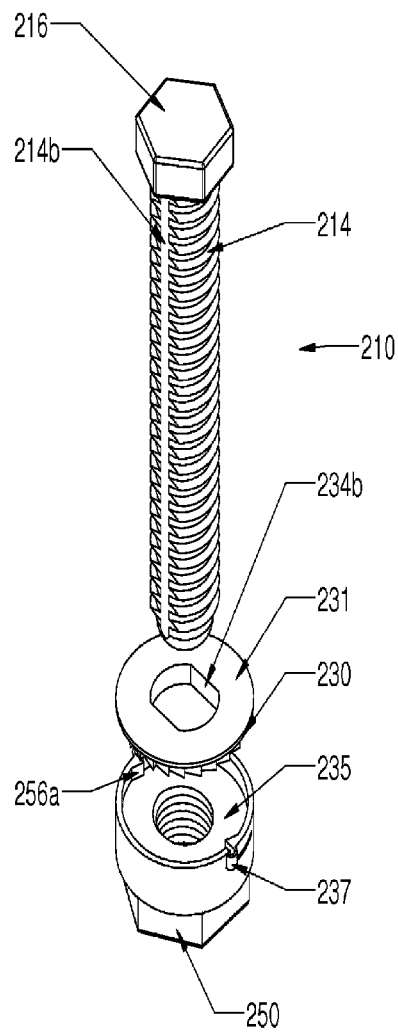
FIG. 14 is a top perspective view of the fastening device of FIG. 12, with the lock washer and locking nut axially aligned and separated from the fastener body for ease of illustration.
Figure 15:
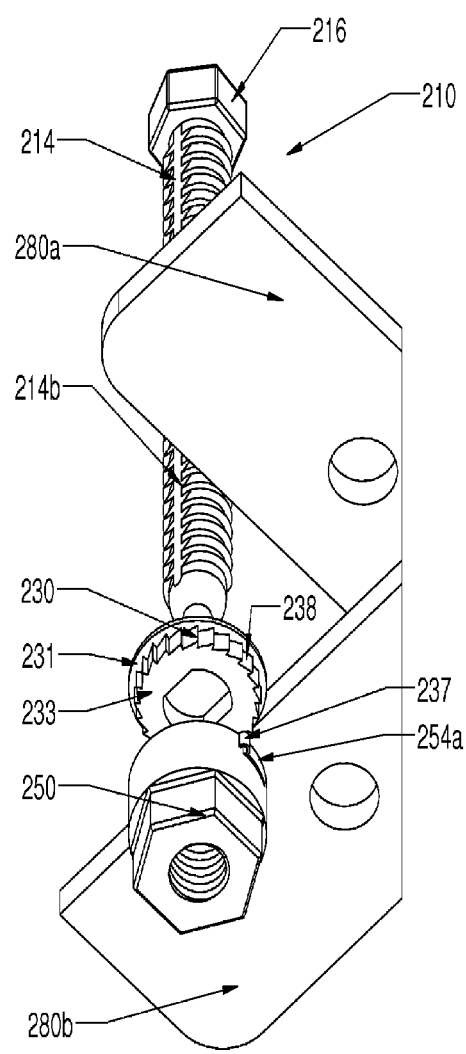
FIG. 15 is a bottom perspective view of the fastening device of FIG. 12, with the plate, the lock washer, and the lock nut axially aligned and separated from the fastener body for ease of illustration.

Referring now to FIGS. 14 and 15, top and bottom perspective views of the fastening device 210, with the lock washer 230 and locking nut 250 axially aligned and separated from the fastener body 214, are shown, respectively. The lock washer 230 includes an optional base plate 231 with which the lock washer ratchet teeth 238 are integral. The teeth 238 are located on the outer circumference of the lower portion 233 of the lock washer 238.

The locking nut 250 forms a cavity 235 into which the lower portion 233 of the lock washer 230 fits so that the base plate 231 rests against the locking nut 250 and the lock washer ratchet teeth 238 are aligned with the locking nut pawl teeth 256a, 256b. In one embodiment, the fit between the lock washer 230 and locking nut 250 is such that the combination may be sold and treated during installation as an integral unit. In such a case, distal curved hooks 237 on the pawl arms 254a, 254b allow using a tool (see FIG. 16a) to splay the pawl arms 254a, 254b radially outward during insertion of the lock washer 230. The same tool may also be utilized to splay the pawl arms 254a, 254b radially outward in order to remove the locking nut 250 after tightening.

Figure 13:
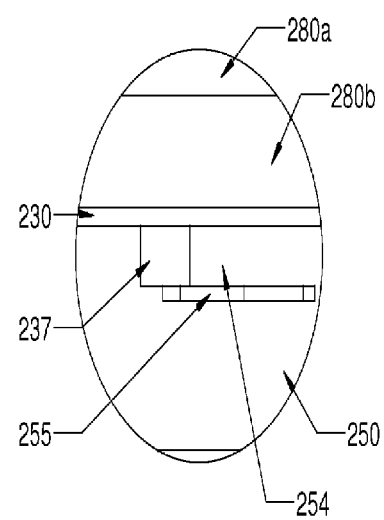
FIG. 13 is an enlarged detailed view of the area in circle "13" of FIG. 12.

Referring now particularly to FIG. 13, an enlarged detailed view of the area in circle "13" of FIG. 12 is shown to illustrate the lock washer 230 and locking nut 250 after assembly and tightening of the fastening device 210. When assembled, the ratchet teeth 238 and the locking nut pawl teeth 256a, 256b again form a ratchet and pawl that allows tightening of the fastening device 210 but prevents loosening due to the interaction between the lock washer 230 and locking nut 250. During tightening, as the locking nut 250 rotates about the lock washer 230, the pawl arms 254a, 254b deflect radially outward to traverse across the teeth 238 of the lock washer 230. However, the configuration of the ratchet and pawl is such that travel only proceeds in the tightening direction without undue force.

Figures 16A, 16B:
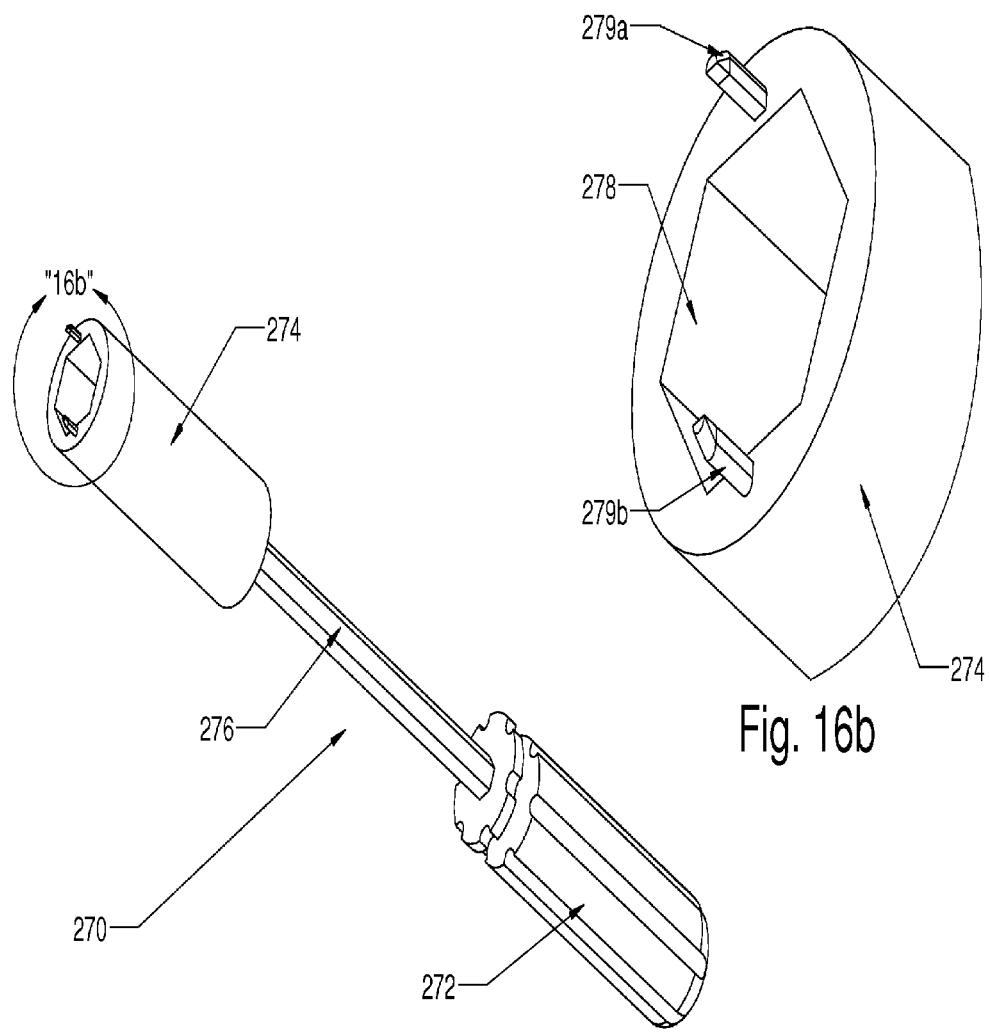

Referring now to FIGS. 16a and 16b, perspective and enlarged detailed views of a tool 270 for assembling and/or disassembling the fastening device 210 are shown, respectively. The tool 270 has a shaft 276 extending between a proximal handle 272 and a distal working portion 274. The distal working portion 274 includes a socket aperture 278 for coupling to the locking nut 250 in a traditional manner. The working portion 274 also include diametrically opposed posts 279a, 279b that couple into the curved hooks 237 on the pawl arms 254a, 254b such that upon loosening the locking nut 250 with the tool 270, the pawl arms 254a, 254b are flexed radially outward to disengage the ratchet and pawl mechanism.

Figure 17:
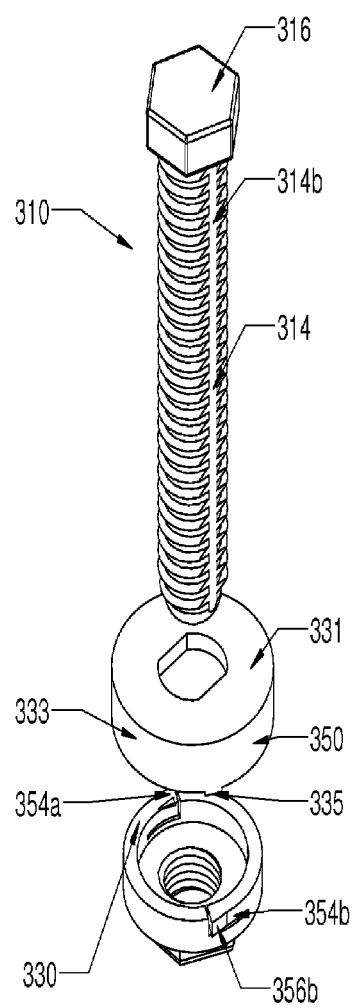
FIG. 17 is a top perspective view of still another fastening device with the lock washer and locking nut axially aligned and separated from the fastener body for ease of illustration.
Figure 18:
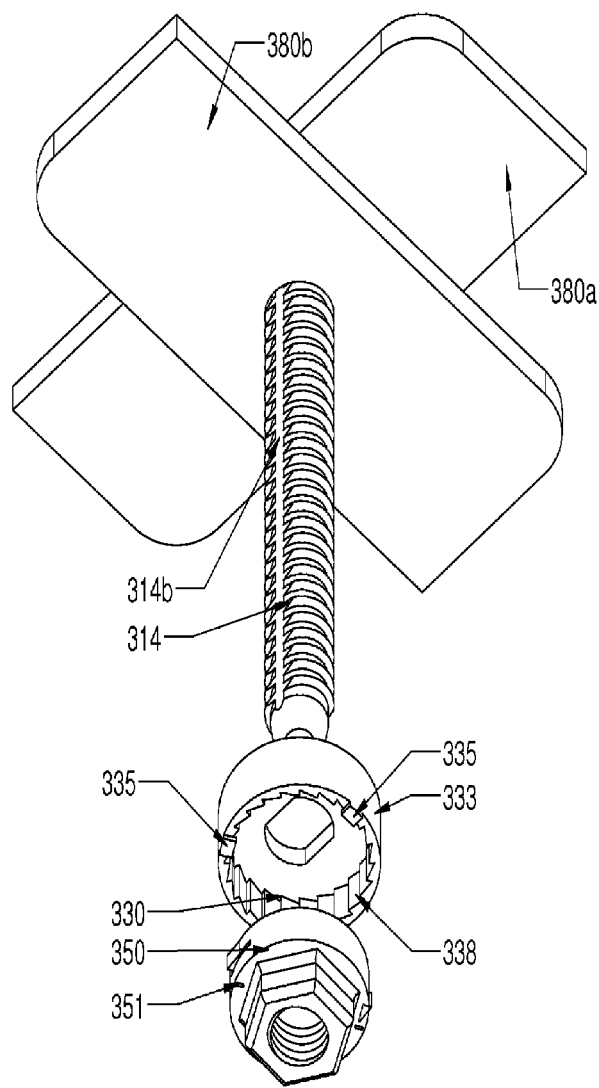
FIG. 18 is a bottom perspective view of the fastening device of FIG. 17, with the lock washer, and the lock nut axially aligned and separated from the fastener body for ease of illustration.

Now referring to FIGS. 17 and 18, top and bottom perspective exploded views of another fastening device 310 of the subject technology are shown. As will be appreciated by those of ordinary skill in the pertinent art, the fastening device 310 utilizes similar principles to the fastening devices 10, 110, 210 described above. Accordingly, like reference numerals preceded by the numeral "3" are used to indicate like elements. The following description is directed to the primary difference of the fastening device 310, which in comparison to the fastening devices 210 is a varied configuration of the locking washer 330 and lock nut 350.

The lock washer 330 includes a base plate 331 with an annular wall 333 extending therefrom. The lock washer ratchet teeth 338 are formed on the inner radius of the annular wall 333. Three optional flanges 335 extend from the lower end of the annular wall 333 to facilitate retaining the locking nut 350 therein.

The locking nut 350 is sized to fit within the annular wall 333 of the lock washer 330 so that the lock washer ratchet teeth 338 are aligned with the locking nut pawl teeth 356a, 356b. In one embodiment, the optional flanges 335 are welded into place after assembly to permanently fix the lock washer 330 and locking nut 350 as an assembly.

Figure 19A:
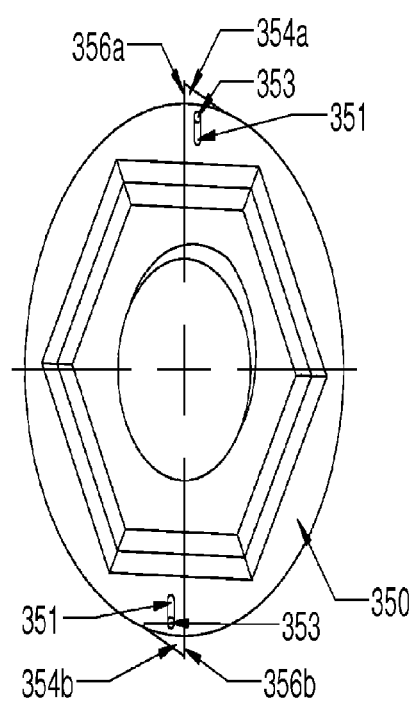
FIG. 19a is a top view of a locking nut of the fastening device of FIG. 17.
Figure 19B:
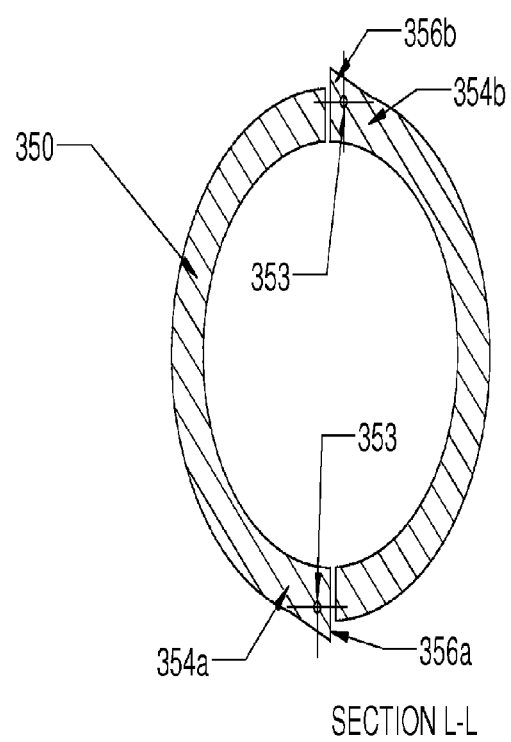
FIG. 19b is a cross-sectional view of a locking nut of the fastening device of FIG. 17.

Referring now to FIGS. 19a and 19b, top and cross-sectional views of the locking nut 350 are shown, respectively. It is noted that the cross-sectional view of FIG. 19b passes through the pawl arms 354a, 354b. The locking nut 350 defines slotted apertures 351 aligned with circular holes 353 in the pawl arms 354a, 354b. Consequently, a removal tool (not shown) may include two posts that can be inserted through the slotted apertures 351 into the circular holes 353. As the two posts are moved radially inward, the pawl arms 354a, 354b splay radially inward to remove the pawl teeth 356a, 356b from the ratchet teeth 338 of the lock washer 330 in order to remove the locking nut 350 after tightening.

Figure 20:
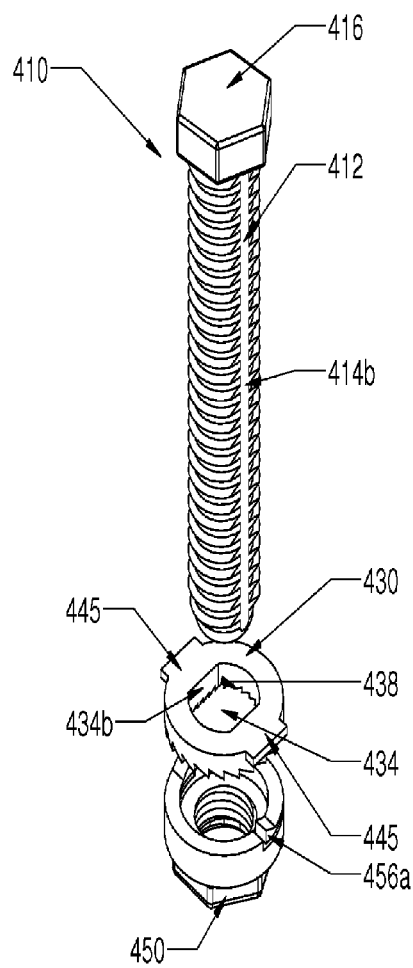
FIG. 20 is a top perspective view of yet another fastening device of the subject technology utilizing a lock plate.
Figure 21:
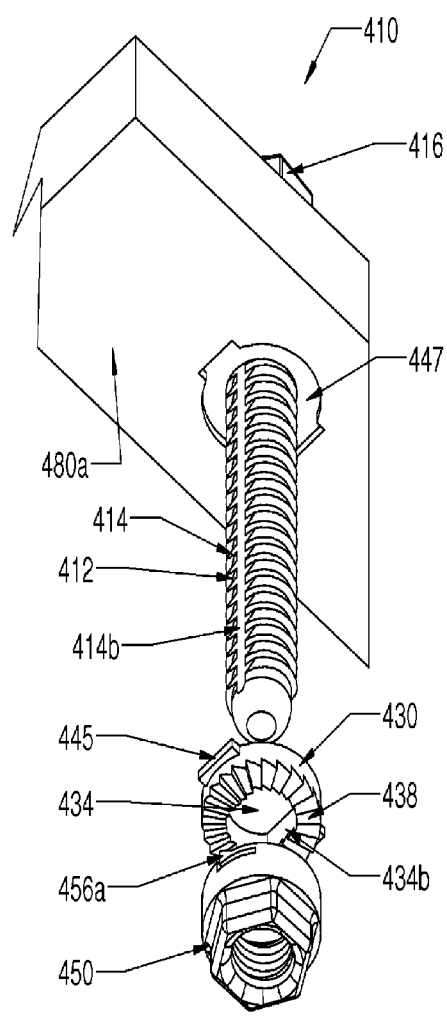
FIG. 21 is a bottom perspective view of the fastening device of FIG. 20.

Now referring to FIGS. 20 and 21, top and bottom perspective exploded views of another fastening device 410 of the subject technology are shown. As will be appreciated by those of ordinary skill in the pertinent art, the fastening device 410 utilizes similar principles to the fastening devices 10, 110, 210, 310 described above. Accordingly, like reference numerals preceded by the numeral "4" are used to indicate like elements. The following description is directed to the primary difference of the fastening device 410, which is incorporation of features to rotationally couple the plate structure 480 and the lock washer 430.

The lock washer 430 includes ratchet teeth 438 but rather than having a cylindrical circumference, the circumference is interrupted by opposing shoulders 445. The plate structure 480 forms a recess 447 sized and configured to receive the lock washer 430. Because of the non-cylindrical shapes of the lock washer 430 and recess 447, the lock washer 430 is stopped from rotational movement therein. As a result, the flat section 414b of the threaded body portion 414 is optional. During deployment, the ratchet and pawl operation between the lock washer 430 and locking nut 450 occurs equally as effectively as noted above with just the recess 447 of the plate structure 480 preventing lock washer 430 rotation.

Figure 22:
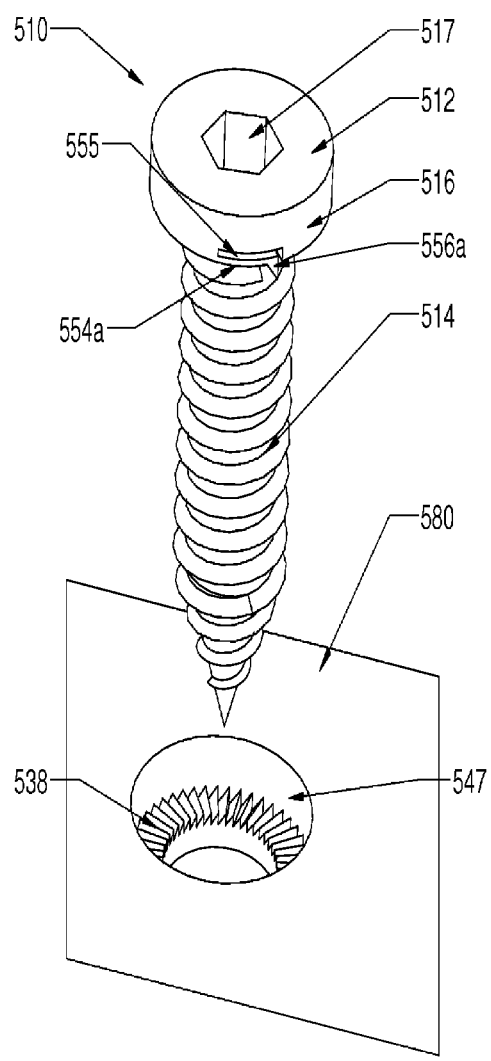
FIG. 22 is a top perspective view of yet still another fastening device with the pawl integral to the head of the threaded fastener in accordance with the subject technology.

Now referring to FIG. 22, a top perspective exploded view of another fastening device 510 of the subject technology is shown. As will be appreciated by those of ordinary skill in the pertinent art, the fastening device 510 utilizes similar principles to the fastening devices 10, 110, 210, 310, 410 described above. Accordingly, like reference numerals preceded by the numeral "5" are used to indicate like elements. The following description is directed to the primary difference of the fastening device 510, which is incorporation of pawl arms 554a, 554b into the fastener head 516.

Figure 23:
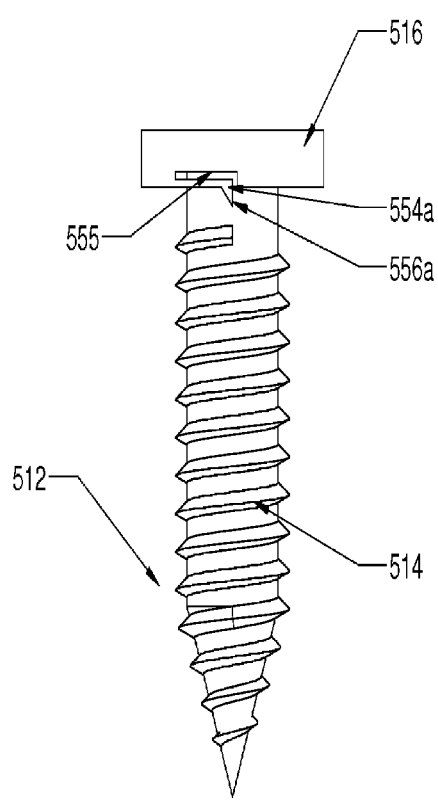
FIG. 23 is a side view of a threaded fastener with the ratchet integral thereto for the fastening device of FIG. 22.

Referring additionally now to FIG. 23, a side view of the threaded fastener 512 is shown. The fastener head 516 defines the pawl arms 554a, 554b in an outer circumference thereof. The fastener head 516 also defines a hexagonal axial recess 517, best seen in FIG. 22, for cooperating with an allen wrench or like driving tool (not shown).

Figure 24A:
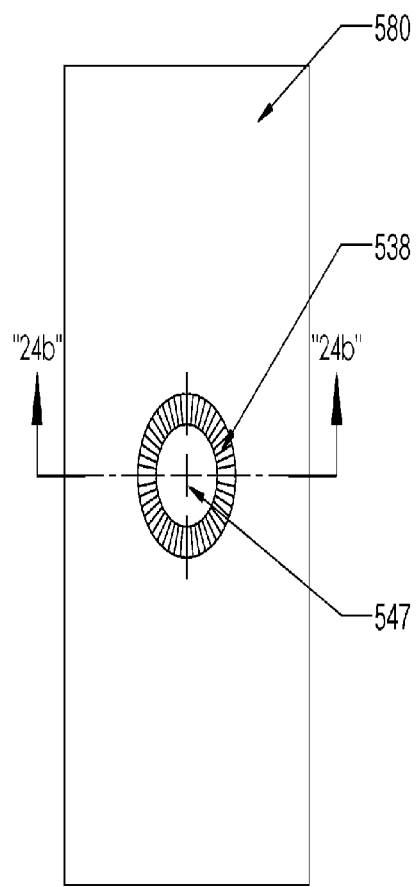
FIG. 24a is a top view of a plate structure with the ratchet integral thereto for the fastening device of FIG. 22.
Figure 24B:
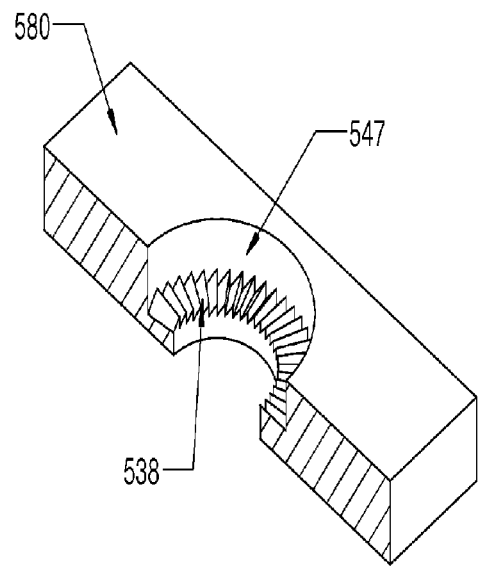
FIG. 24b is a cross-sectional side view of the plate structure of FIG. 24a taken along line "24b"-"24b".

Referring now to FIGS. 24a and 24b, top and cross-sectional views of the plate structure 580 are shown. The plate structure 580 incorporates the ratchet teeth 538 into the bottom of a recess 547. It is envisioned that the plate structure 580 can be any shape or configuration such as a bar, band, plate and the like depending upon the desired application.

Referring again to FIG. 22, the threaded body portion 514 is a self tapping design so that the fastener 512 can pass through the plate structure 580 and threadably engage a structure opposite thereto. In an alternative embodiment, the threaded body portion 514 has machine threads that mate into machine threads of the plate structure 580. Upon the fastener head 516 reaching the ratchet teeth 538 in the plate structure 580, the teeth 556a, 556b of the pawl arms 554a, 554b engage the ratchet teeth 538 to prevent reversal of the fastener 512 in the normal course. In an alternative embodiment, a radial hole is provided in the pawl arms 554a, 554b to allow inserting a tool and pulling the pawl arms 554a, 554*b* upward to disengage the ratchet and pawl, thereby allowing reversal of the fastener 512.

Figure 25:
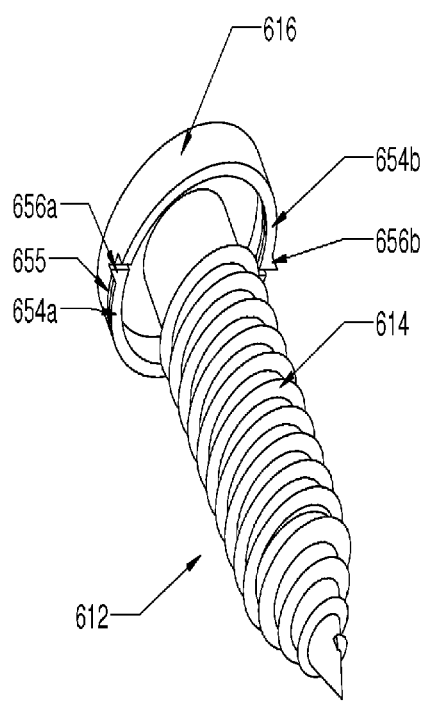
FIG. 25 is a bottom perspective view of yet still another fastener with the pawl integral to the head thereof for a radial engagement configuration in accordance with the subject technology.
Figure 26:
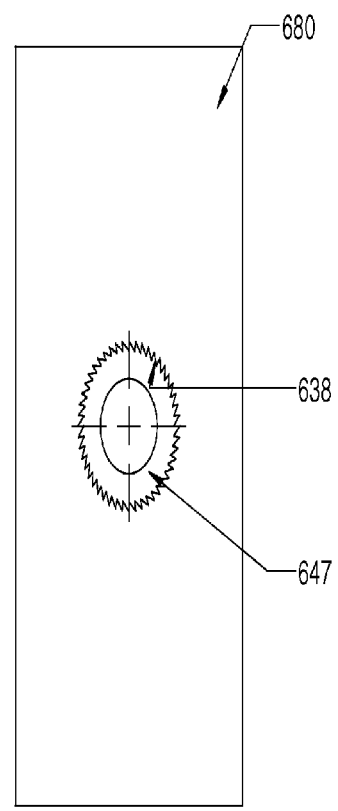
FIG. 26 is a top view of a plate structure with the ratchet integral thereto for use with the fastener of FIG. 25.
Figure 27A:
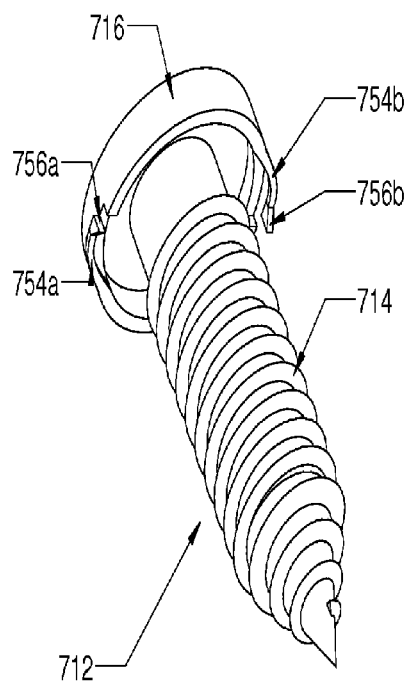
FIG. 27a is a bottom perspective view of yet still another fastener with the pawl integral to the head thereof for a radial engagement configuration in accordance with the subject technology.
Figure 27B:
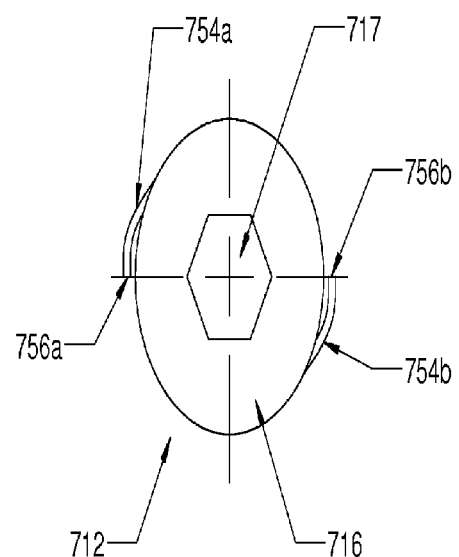
Figure 28B:
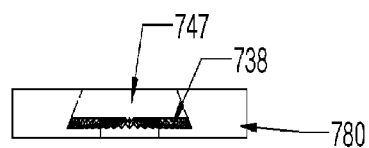
FIG. 28b is a sectional view of the plate structure of FIG. 28a taken along line "28b"-"28b".
Figure 28A:
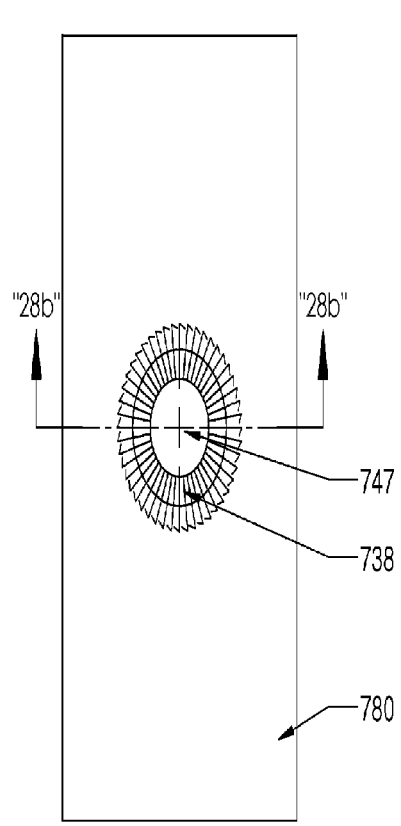
Figure 28C:
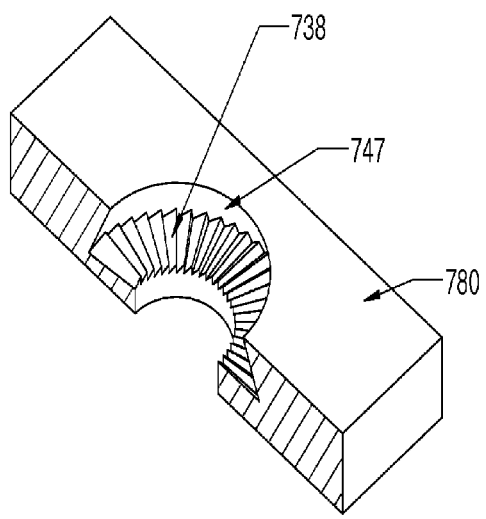

Now referring to FIGS. 25 and 26, a bottom perspective exploded view of another fastener 612 and a top view of a plate structure 680 of the subject technology are shown. As will be appreciated by those of ordinary skill in the pertinent art, the fastener 612 and plate structure 680 utilize similar principles to the fastening devices described above and like reference numerals preceded by the numeral "6" are used to indicate like elements. The primary differences relate to providing the ratchet and pawl engagement in a radial manner while incorporating the pawl arms 654*a*, 654*b* into the fastener head 616.

In the plate structure 680, the ratchet teeth 638 are again disposed in the recess 647 but located in the sidewall rather than the bottom of the recess 647. The fastener head 616 is sized and configured to fit into the recess 647 so that the pawl teeth 656*a*, 656*b* of the pawl arms 654*a*, 654*b* engage with the ratchet teeth 638.

Now referring to FIGS. 27*a*-28*c*, various views of another fastener 712 and a plate structure 780 of the subject technology are shown. The primary differences are that the pawl arms 754*a*, 754*b* extend radially outward from the fastener head 716 and the recess 747 has a trapezoidal cross-sectional shape (best seen in FIG. 28*b*). The combination of the radially extended pawl arms 754*a*, 754*b* within the trapezoidal recess 747 may create an effective capture of the fastener head 716 therein so that once combined, the fastener 712 is coupled to the plate structure 780. A radially engaging ratchet and pawl version could equally as well utilize the radially extended pawl arms.

Figures 29, 30A:
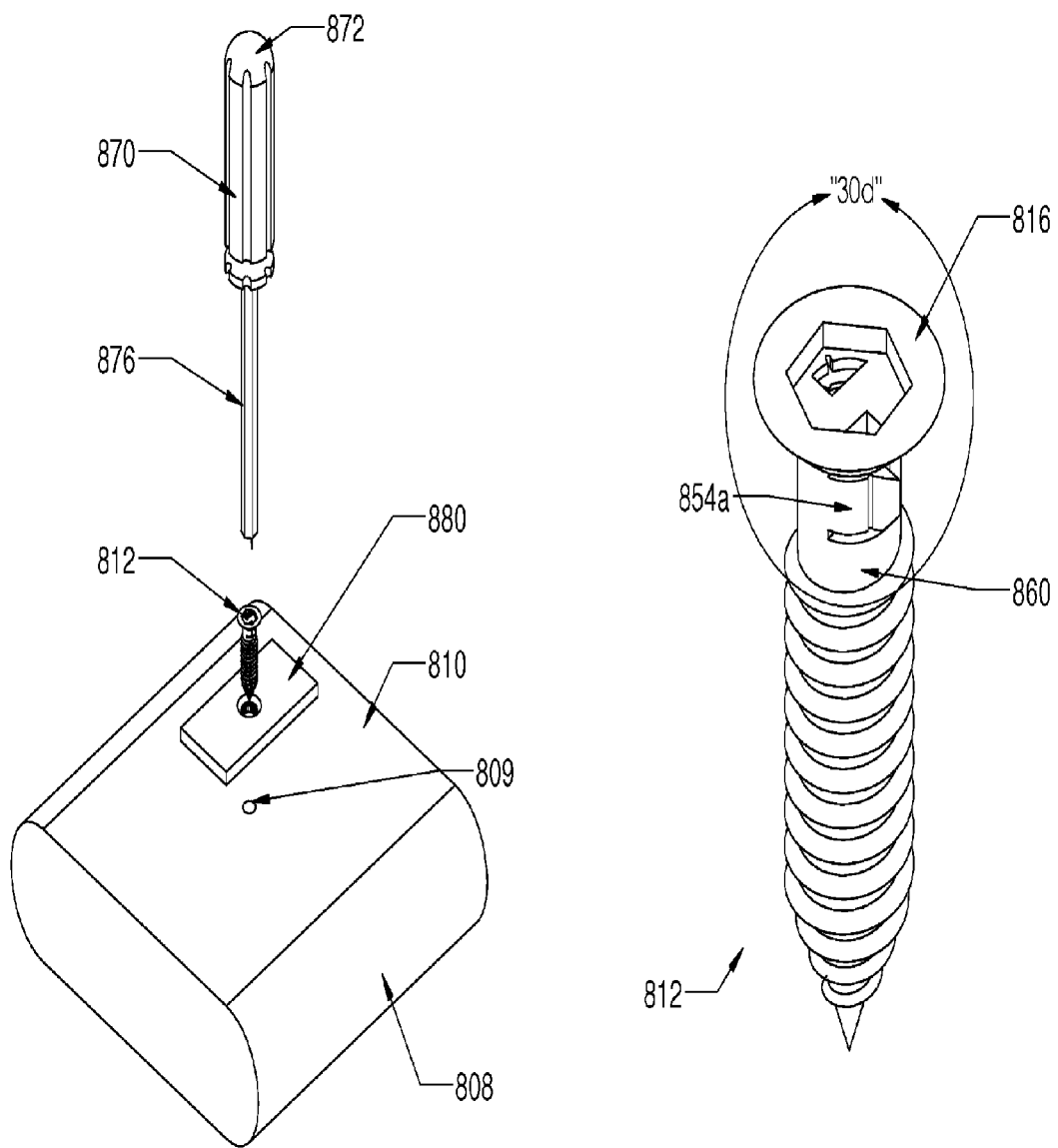
FIG. 29 is a top perspective view of yet still another fastening device aligned with a driving tool for inserting and removing the fastener in accordance with the subject technology.
FIG. 30a is a perspective view of the fastener of FIG. 29.

Now referring to FIG. 29, a top perspective exploded view of another fastening device 810 being attached to an object 808 in accordance with the subject technology is shown. The object 808 could be any size or shape and preferably includes a pilot hole 809 to facilitate easy insertion of the fastener 812. As will be appreciated by those of ordinary skill in the pertinent art, the fastening device 810 utilizes similar principles to the fastening devices described above and like reference numerals preceded by the numeral "8" are used to indicate like elements. The following description is directed to the primary differences of the fastening device 810, which is incorporation of the pawl arms 854*a*, 854*b* into a rim 860 of the threaded body portion 814 of the fastener 812.

Figure 30D:
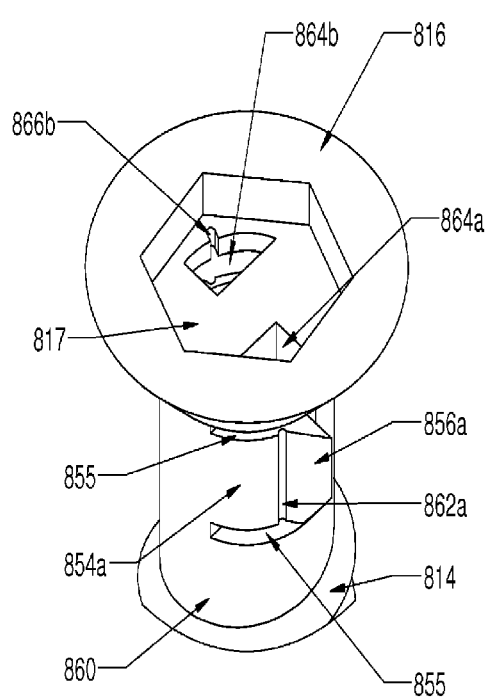
Figure 30E:
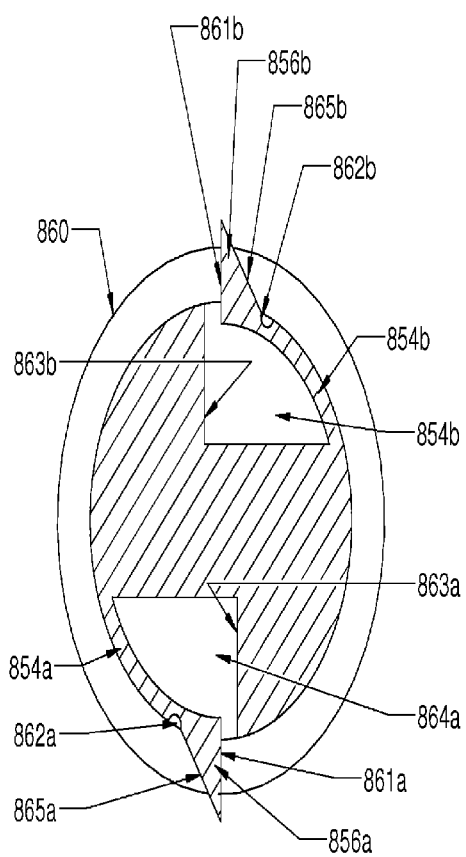
FIG. 30e is a sectional view of the fastener of FIG. 30b taken along line "30e"-"30e".

Referring now to FIGS. 30*a*-*e*, various views of the fastener 812 of FIG. 29 are shown in detail. The rim 860 between the head 816 and body portion 814 includes the pawl arms 854*a*, 854*b*. The pawl arms 854*a*, 854*b* are formed by slots 855 with radially extending distal teeth 856*a*, 856*b*. The pawl arms 854*a*, 854*b* also define an axial slot 862*a*, 862*b* adjacent the teeth 856*a*, 856*b*. As best seen in FIG. 30*e*, the pawl teeth 856*a*, 856*b* are triangular with legs 861*a*, 861*b* and a hypotenuse 865*a*, 865*b* that engage the ratchet teeth 838.

As best seen in FIGS. 30*c*-*e*, the fastener head 816 has axial apertures 864*a*, 864*b* that extend at least into if not through the rim 860. The axial apertures 864*a*, 864*b* also include notches 866*a*, 866*b* that align with the axial slots 862*a*, 862*b* on the pawl arms 854*a*, 854*b* that allow the fastener 812 to be reversible as described below. In an alternative embodiment, the fastener 812 does not have axial slots in the pawl arms or notches in the apertures of the head so that the fastener is not reversible. The fastener head 816 also forms a traditional hexagonal recess 817.

Figure 31A:
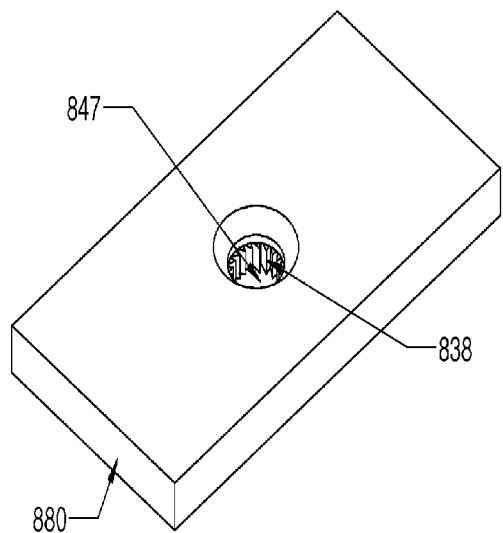
FIG. 31a is a perspective view of the plate structure of FIG. 29.
Figure 31B:
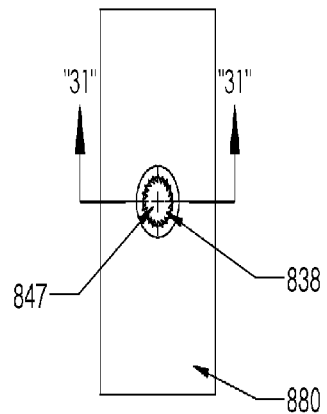
Figure 31C:
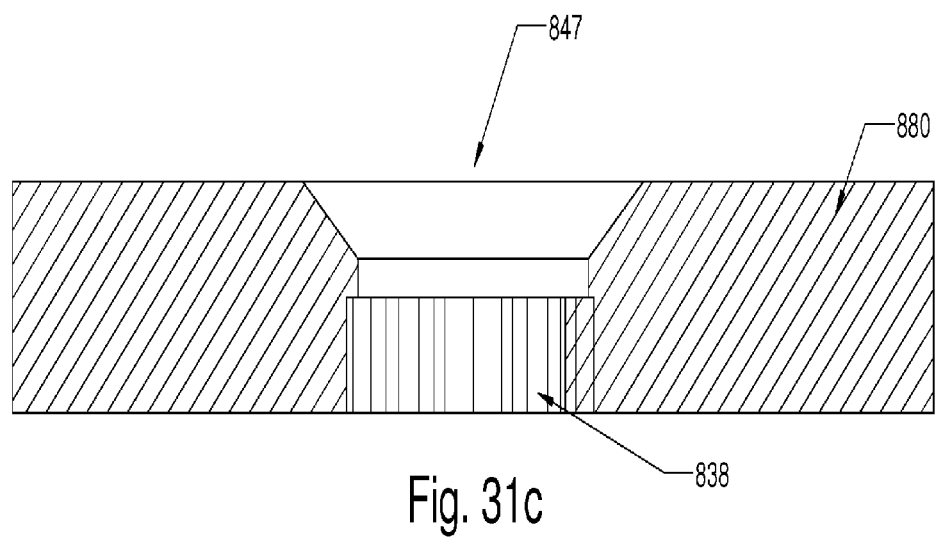
FIG. 31c is a sectional view of the plate structure of FIG. 31b taken along line "31c"-"31c".
Figures 32A, 32B:
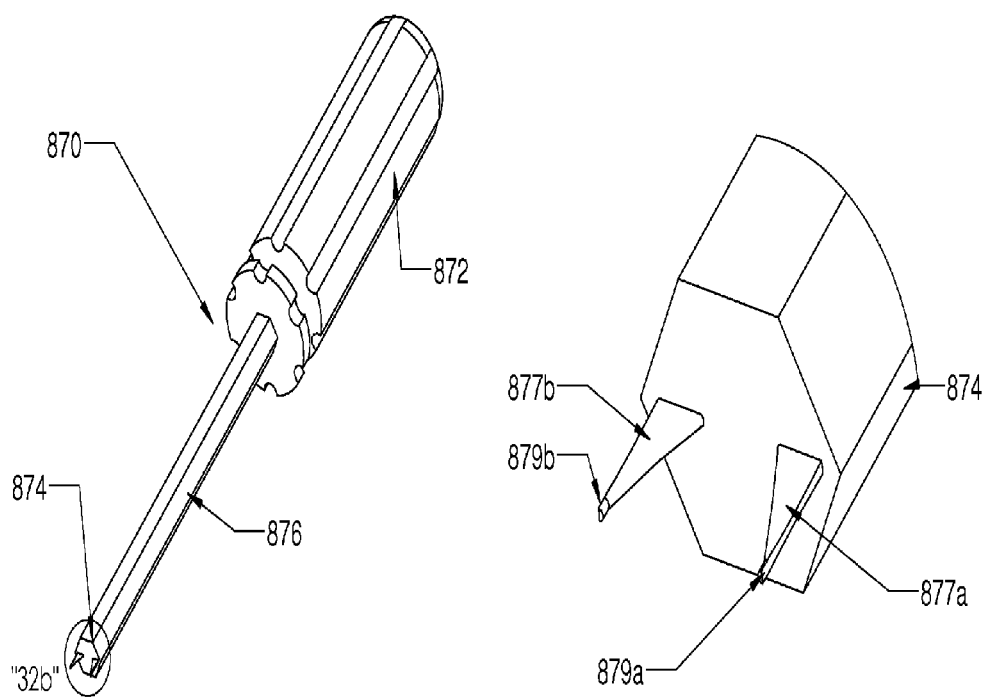

Referring now to FIGS. 31*a*-*c*, various views of the plate structure 880 are shown. The plate structure 880 is particularly suited to couple with the fastener 812 to form a ratchet and pawl engagement. The recess 847 is countersunk to compliment the shape of the fastener head 816. The ratchet teeth 838 are arranged vertically to interact with the pawl arm teeth 856*a*, 856*b* during tightening of the fastener 812.

Referring now to FIGS. 32*a*-*d* various views of the driving tool 870 for tightening and removing the fastener 812 are shown. The shaft 872 is hexagonal to couple with the recess 817 of the fastener head 816. The driving tool 870 includes two projections 877*a*, 877*b* on the distal working portion 874. Each projection 877*a*, 877*b* includes a tip 879*a*, 879*b* sized to insert into the respective axial slots 862*a*, 862*b* of the pawl arms 854*a*, 854*b* when the projections 877*a*, 877*b* are fully inserted into the axial apertures 864*a*, 864*b* of the fastener head 816. Once the projections 877*a*, 877*b* are fully inserted, the driving tool 870 can be rotated to tighten or remove the fastener 812 as desired. A standard hex tool can also be used to tighten the fastener 812 with the pawl arm teeth 856*a*, 856 ratcheting on the ratchet teeth 838.

During tightening the fastener 812, the driving tool shaft 876 engages the fastener head 816 so that the fastener 812 can be rotated. The fastener 812 would self tap into the object 808 and bring the rim 860 into the recess 847. In an alternative embodiment, the fastener 812 has machine threads that mate into corresponding machine threads in object 808. Similar to above, the pawl teeth 856*a*, 856*b* and ratchet teeth 838 would interact to allow tightening but prevent loosening unless the loosening force is applied by the driving tool 870.

To remove the fastener 812, the driving tool 870 is fully inserted into the fastener head 816 so that the tips 879*a*, 879*b* of the projections 877*a*, 877*b* press into the axial slots 862*a*, 862*b*. As best envisioned with respect to FIG. 30*e*, a counter-clockwise rotation of the driving tool 870 would force the pawl arms 854*a*, 854*b* to deflect radially inward so that the legs 861*a*, 861*b* of the pawl teeth 856*a*, 856*b* move radially inward until touching a sidewall 863*a*, 863*b* of the axial apertures 864*a*, 864*b*. As a result, the pawl teeth 856*a*, 856*b* are disengaged from the ratchet teeth 838 and the fastener 812 is able to be rotated out.

The fastening device technology described herein has unlimited application in industry and other uses. Particularly advantageous applications will involve use near motors or moving equipment in which vibration may cause loosening of traditional fasteners such as in automotive applications, aerospace applications, and manufacturing machinery. The present fastening device technology is also well suited for medical applications such as attaching pedicle screws to spinal rods, attaching spinal plates and fracture plates, fixing artificial joints like hips and knees, and the like.

While the subject invention has been described with respect to preferred and exemplary embodiments, those skilled in the art will readily appreciate that various changes and/or modifications can be made to the invention without departing from the spirit or scope of the invention as described herein and as defined by the appended claims.

What is claimed is:

1. A fastening device comprising:
    a) a fastener having a head portion and an elongated threaded body portion extending axially from the head portion;
    b) a lock member having a first surface with a plurality of ratchet teeth, the lock member coupling to the body portion for axial movement but is fixed rotationally; and
    c) a threaded lock nut for rotatably mating with the threaded body portion, the lock nut having at least one pawl arm having a second surface having at least one pawl tooth for ratcheted engagement with the plurality of ratchet teeth, wherein the second surface of the at least one pawl arm extends along the plurality of ratchet teeth of the lock member when the threaded lock nut and the lock member are rotatably mated such that the ratchet teeth are allowed to move along the second surface toward the at least one pawl tooth for ratcheted engagement with the at least one pawl tooth, wherein the threaded lock nut includes a curved hook disposed on the at least one pawl arm radially outward of the at least one pawl tooth to receive a tool for engaging and disengaging the at least one pawl tooth from ratcheted engagement with the plurality of ratchet teeth, wherein the at least one pawl arm and the threaded lock nut are a single piece.

2. A fastening device as recited in claim 1, wherein the lock member has an axial aperture having at least one flat inner surface cooperating with at least one longitudinally extending flat section of the threaded body portion.

3. A fastening device comprising:
a) a fastener having a head portion and an elongated threaded body portion extending axially from the head portion, the threaded body portion including at least one longitudinally extending flat section;
b) a lock washer having a first surface having an array of engagement teeth, the lock washer also defines an axial aperture for receiving the threaded body portion of the fastener, the aperture having at least one inner surface cooperating with the at least one longitudinally extending section of the threaded body portion to prevent relative rotation of the washer and threaded body portion; and
c) a threaded lock nut for rotatably mating with the threaded body portion, the lock nut having a second surface having a pair of arcuate, cantilevered pawl members for ratcheted engagement with the array of engagement teeth of the lock washer, wherein the second surface extends along the array of engagement teeth of the lock washer when the threaded body portion and the threaded lock nut are rotatably mated such that the engagement teeth are allowed to move along the second surface toward at least one pawl tooth of the pawl members for ratcheted engagement with the at least one pawl tooth, wherein the cantilever pawl members and the lock nut are a single piece;
wherein the threaded lock nut includes a curved hook disposed radially outward of at least one of the cantilevered pawl members to receive a tool for engaging and disengaging the at least one of the cantilevered pawl members from ratcheted engagement with the engagement teeth of the lock washer.

4. A fastening device as recited in claim 3, wherein the at least one inner surface is selected from the group consisting of a flat surface, a plurality of flat surfaces, a circular cut, a plurality of circular cuts, a groove cut, a plurality of groove cuts, a keyhole cut, a plurality of keyhole cuts, a triangular cut, a plurality of triangular cuts, and combinations thereof, and the at least one longitudinally extending section is selected from the group consisting of a flat section, a plurality of flat sections, a circular section, a plurality of circular sections, a groove section, a plurality of groove sections, a keyhole section, a plurality of keyhole sections, a triangular section, a plurality of triangular sections, and combinations thereof.

5. A fastening device as recited in claim 3, wherein the fastener, the lock washer, and the threaded lock nut are adapted and configured for a medical application.

* * * * *